(12) United States Patent
Yearwood

(10) Patent No.: US 11,284,040 B2
(45) Date of Patent: Mar. 22, 2022

(54) SURVEILLANCE UNIT WITH REMOVABLE MODULES

(71) Applicant: Clebert O'Bryan Ricardo Yearwood, Bedfordshire (GB)

(72) Inventor: Clebert O'Bryan Ricardo Yearwood, Bedfordshire (GB)

(73) Assignee: Exsis Limited, Bedfordshire (GB)

( * ) Notice: Subject to any disclaimer, the term of this patent is extended or adjusted under 35 U.S.C. 154(b) by 114 days.

(21) Appl. No.: 15/570,355

(22) PCT Filed: Apr. 29, 2016

(86) PCT No.: PCT/GB2016/051243
§ 371 (c)(1),
(2) Date: Oct. 29, 2017

(87) PCT Pub. No.: WO2016/174466
PCT Pub. Date: Nov. 3, 2016

(65) Prior Publication Data
US 2018/0295327 A1    Oct. 11, 2018

(30) Foreign Application Priority Data

Apr. 30, 2015 (EP) ...................................... 1507392

(51) Int. Cl.
*H04N 7/18* (2006.01)
*B64C 39/02* (2006.01)
(Continued)

(52) U.S. Cl.
CPC ............ *H04N 7/181* (2013.01); *B25J 11/002* (2013.01); *B60P 3/025* (2013.01); *B60P 3/32* (2013.01);
(Continued)

(58) Field of Classification Search
None
See application file for complete search history.

(56) References Cited

U.S. PATENT DOCUMENTS

2006/0249622 A1   11/2006   Steele
2007/0294958 A1*  12/2007   Kestermann .......... E04B 1/3483
                                                              52/79.1
(Continued)

FOREIGN PATENT DOCUMENTS

EP        2581524 A2       4/2013
WO    2007/119009 A1      10/2007
(Continued)

OTHER PUBLICATIONS

International Search Report and Written Opinion received for PCT Application No. PCT/GB2016/051243, dated Nov. 8, 2016, 11 pages.
(Continued)

*Primary Examiner* — Stuart D Bennett
(74) *Attorney, Agent, or Firm* — Fiala & Weaver P.L.L.C.

(57) ABSTRACT

There is disclosed a deployable surveillance, security and/or enforcement unit, comprising: a container configured for deployment from a vehicle or by air at a surveillance, security and/or enforcement location; and two or more removable modules having equipment for performing surveillance, security and/or enforcement operations, wherein the container has a housing with at least one opening for receiving the two or more modules into the container. The unit may be comprised as part of a vehicle. The advantage of this arrangement is that it is flexible and can be deployed to meet temporary requirements, changing requirements, and can be easily equipped to meet differing roles. The deployable surveillance, security and/or enforcement unit may comprise removable modules including: a command
(Continued)

module; a reconnaissance module; a sampling and diagnostic laboratory module; a decontamination module; and/or a utilities module.

39 Claims, 19 Drawing Sheets

(51) Int. Cl.
| | |
|---|---|
| *G06K 9/00* | (2022.01) |
| *G08B 13/196* | (2006.01) |
| *F41H 11/00* | (2006.01) |
| *F41H 7/00* | (2006.01) |
| *E04H 1/12* | (2006.01) |
| *B60P 3/32* | (2006.01) |
| *B60P 3/025* | (2006.01) |
| *B25J 11/00* | (2006.01) |
| *G06K 9/32* | (2006.01) |

(52) U.S. Cl.
CPC ......... *B64C 39/024* (2013.01); *E04H 1/1238* (2013.01); *F41H 7/005* (2013.01); *F41H 11/00* (2013.01); *G06K 9/00288* (2013.01); *G06K 9/00771* (2013.01); *G06K 9/325* (2013.01); *G08B 13/19632* (2013.01); *H04N 7/18* (2013.01); *B64C 2201/042* (2013.01); *B64C 2201/08* (2013.01); *B64C 2201/127* (2013.01); *B64C 2201/141* (2013.01); *B64C 2201/146* (2013.01); *B64C 2201/182* (2013.01); *B64C 2201/201* (2013.01); *B64C 2201/208* (2013.01); *E04H 2001/1283* (2013.01)

(56) References Cited

U.S. PATENT DOCUMENTS

| | | | |
|---|---|---|---|
| 2012/0080556 A1 | 4/2012 | Root, Jr. | |
| 2012/0200992 A1* | 8/2012 | Schmitt | H05K 7/1497 361/679.02 |
| 2014/0361540 A1* | 12/2014 | Knight | F03D 80/88 290/44 |
| 2015/0344222 A1* | 12/2015 | Disorbo | B65D 88/129 414/809 |
| 2017/0225802 A1* | 8/2017 | Lussier | E04H 12/003 |

FOREIGN PATENT DOCUMENTS

| | | |
|---|---|---|
| WO | 2013/055265 A1 | 4/2013 |
| WO | 2016/174466 A2 | 11/2016 |

OTHER PUBLICATIONS

Office Action received for European Patent Application No. 16728069.2, dated Nov. 3, 2021, 6 pages.

* cited by examiner

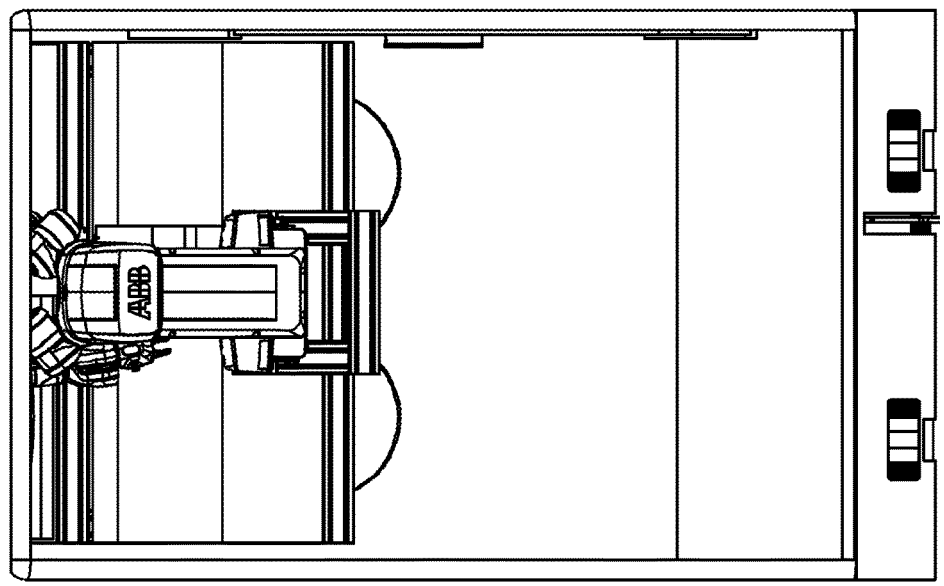
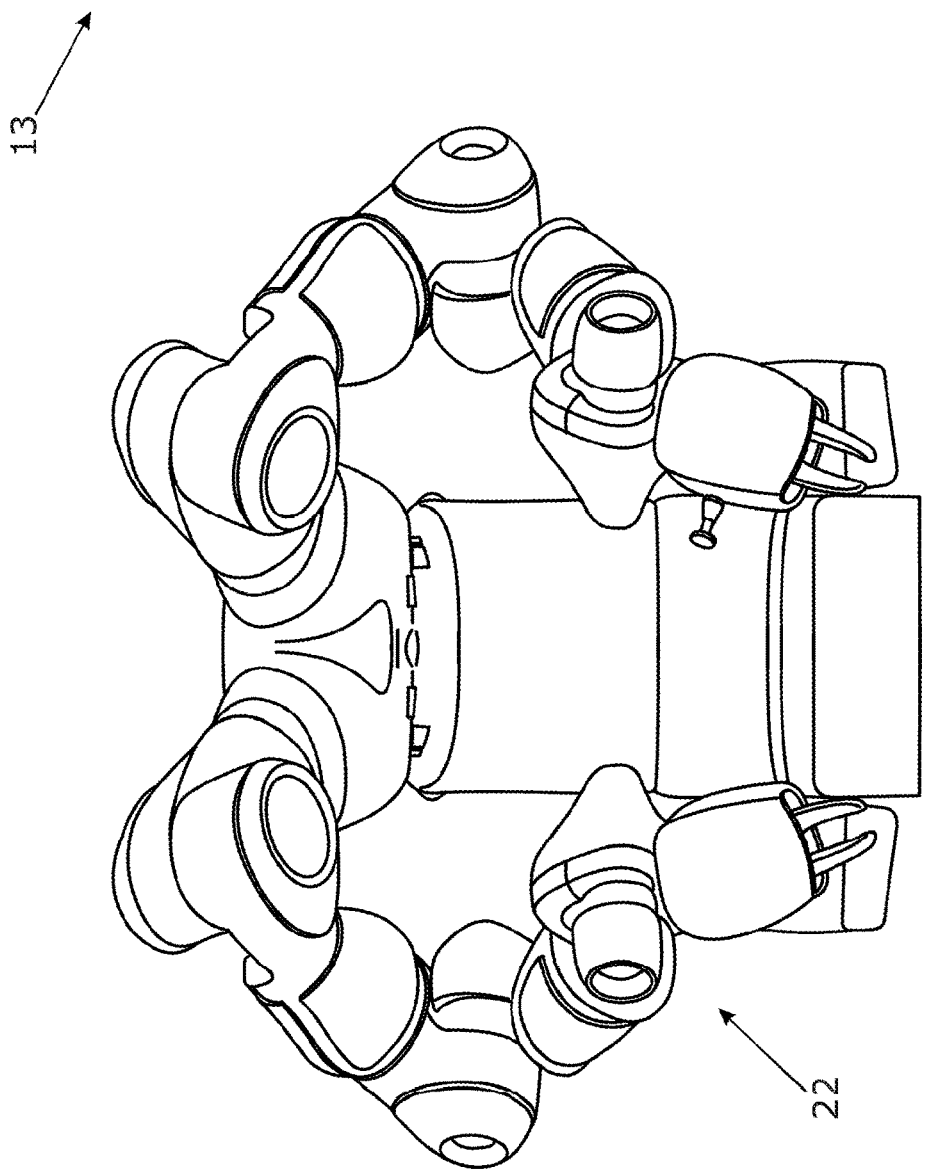
Fig. 5(b)
Fig. 5(a)

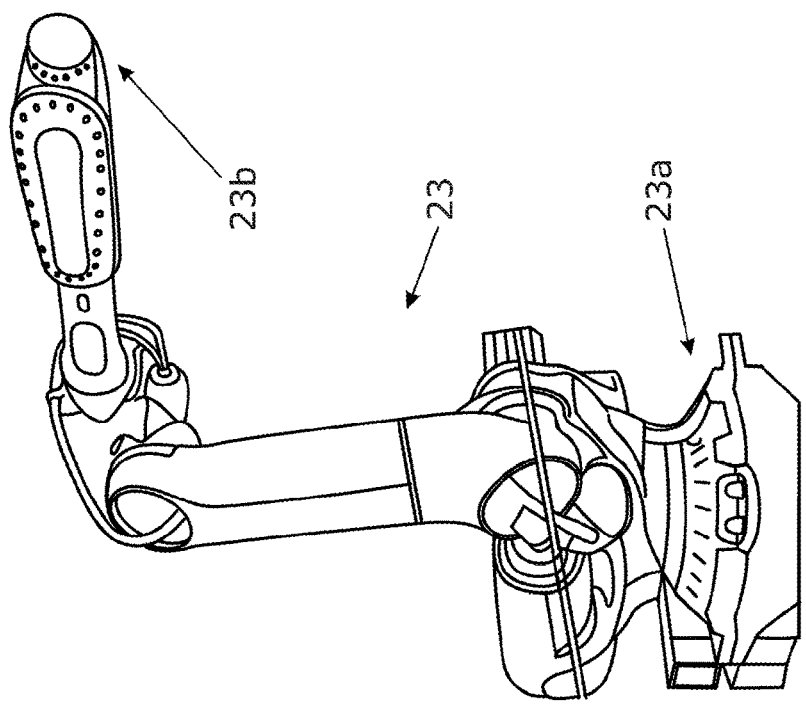
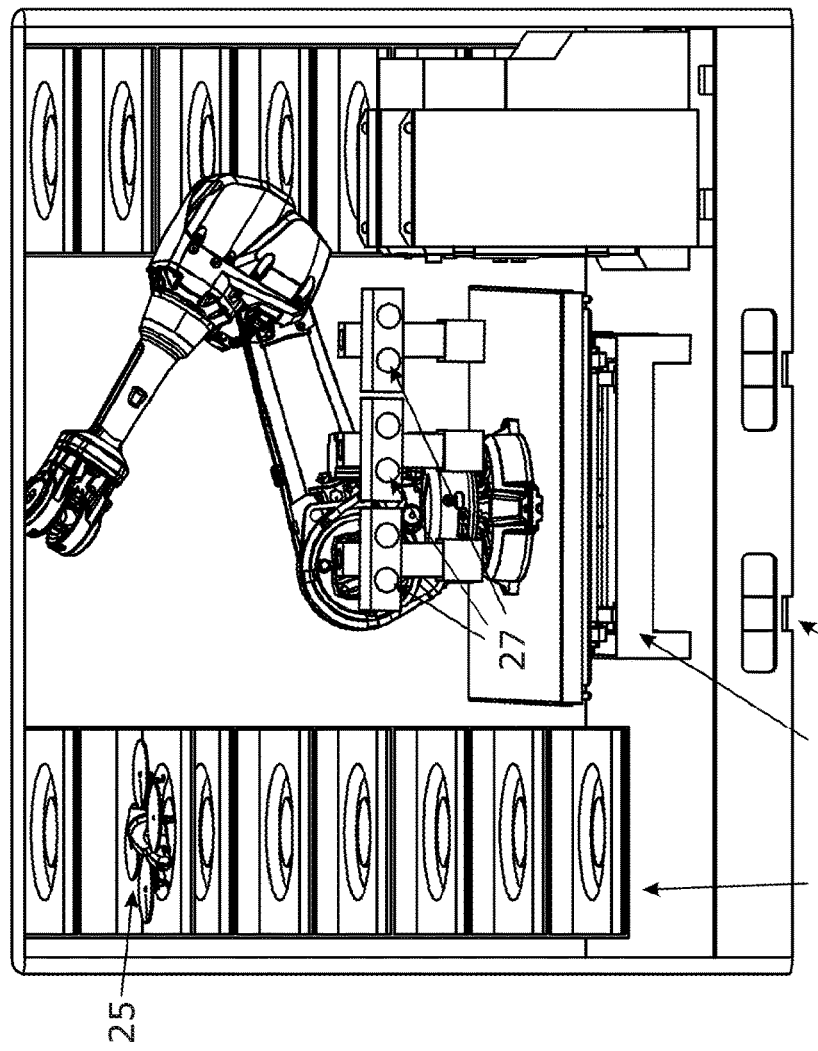
Fig. 6(b)
Fig. 6(a)

SURVEILLANCE UNIT WITH REMOVABLE MODULES

CROSS-REFERENCE TO RELATED APPLICATION(S)

This application claims priority to International Patent Application No. PCT/GB2016/051243 filed on Apr. 29, 2016 which claims priority to UK Patent Application No. GB 1507392.7 filed Apr. 30, 2015, the disclosures of which are herein incorporated by reference in their entirety.

BACKGROUND

Technical Field

The present application relates to a surveillance, security and enforcement management unit and method. For example, aspects of the application relate to a security management vehicle having an integrated six-axis robotic arm and cabin.

Background Art

Conventional methods and apparatuses for surveillance comprise CCTV cameras often mounted on buildings or vehicles. The cameras are either fixed or can be controlled to move to alter the direction of their scene of view. A security or police command centre receives data from one or more cameras to allow command personnel to assess video received from the one or more cameras. Based on the video personnel are able to make decisions concerning safety, security and enforcement.

At large events or venues a significant number of cameras may be present at fixed positions around the location. Events such as football matches occur at predetermined venues such as football grounds and the surveillance requirements at the venue are largely unvarying from match to match. The surveillance requirements are often determined by the size of the venue and number of people attending the venue. A similar situation arises with concerts whereby the number of people attending is determined by the size of the concert venue.

Other large events are less predictable, such as concerts in outdoors location, large sporting events occurring at multiple closely located venues simultaneously (for example, the Commonwealth Games or Olympics). Another example is a football match in which a team has a large number of supporters visiting a lesser supported team. In these situations the surveillance infrastructure is not set up to meet the demands of the large increase in people at the location or venue. While investment in permanent surveillance infrastructure would alleviate this problem it is costly and the infrastructure may only be needed for one event or a very limited number of events. Hence, the infrastructure cost cannot be justified for such a limited time period. There is therefore a need for a more flexible surveillance solution. Furthermore, the flexibility of movement of CCTV cameras is often more limited than desired, or the type of camera used at a particular location does not meet all of the desired requirements in terms of its functionality.

BRIEF SUMMARY

The subject matter of the present application relates to a deployable unit such as one useful for surveillance, security and enforcement applications. The unit may be comprised of a vehicle or container. An advantage of this arrangement is that it is flexible and can be deployed to meet temporary requirements, changing requirements, and can be easily equipped to meet differing roles.

In embodiments, the present application provides surveillance security and enforcement management. The system removes reliance on finding the right initial location for a surveillance vehicle through an inherently flexible solution using robotics. The system removes reliance on human intervention to detect, report and/or trigger action against threats, and can be left unmanned for long periods of time with a remote (e.g. 4G) link back to a central headquarters (HQ) team and private secure cloud.

Performance of security, surveillance and/or enforcement operations is enhanced and/or risk reduced (or eliminated) by automated detection and reporting (for example, automatic facial recognition or heat signature detection).

The solution provided herein is future-proofed and flexible. A robotic arm is provided which can switch between detection tools. Furthermore, as new technology emerges new tools can be added and software upgrades issued to meet requirements. The capability provides for up to six tools to be available on board for the robotic arm to use. The tools are stored in bays.

Secure automation response via interchangeable robotic modules, as follows:
Anti-Terrorism modules;
Radiation, Biological and Chemical detection modules; and
Flexibility to develop additional functions to be added to the system: interchangeable module options.

The system can be used to perform a multitude of tasks, including the surveillance and collecting of data via modules attached to the robotic system management equipment. A cabin located at the back of this system serves as a mobile command center and communications hub for the security vehicle and equipment.

In further embodiments, the present application provides a surveillance, security and/or enforcement unit comprising a robotic arm, the robotic arm having at least six axes of movement and comprising a base and an end effector. The base is coupled to the module unit and the robotic arm manipulated to perform the requested surveillance, security and/or enforcement functions, wherein the surveillance, security and/or enforcement unit is configured for deployment from a vehicle or detachable flat-bed.

The six axis robotic arm has the advantage of greater maneuverability such that a surveillance device can be positioned to look around objects which would normally block a view. The arm may even be used to look around corners. Furthermore, the end effector provides flexibility in the type of camera or other surveillance device employed for the situation.

The following components are considered to provide the unique advantages of this system:
Robotic arm to cover near-field with cameras and/or other detective tools;
Robot system (such as ABB YuMi robot) allows for a complete unmanned diagnostic sampling system; and
Autonomic drones (UAVs) to cover an expanded field of 3 to 16 km around the system/unit, the drones equipped with cameras and/or detective tools.

The system may be locked on a removable trailer for long-term surveillance such as at venues. This allows the truck to be used on another assignment.

In further embodiments, the application provides an example method as follows:

Step 1: Detachable unit (container) allows the system to be deployed from a "heavy lifting" helicopter. Then the unit's function(s) can be used (unmanned) to assess an area before personnel are deployed into the assigned area.

Step 2: The robotics system uses the preloaded modules to assess the situation (remotely and unmanned). The modules provide: radiation detection, biological detection, chemical detection, video surveillance via a plurality (10) of surrounding cameras and a robotic camera module, and video surveillance via drone deployment, retrieval (recharging via the unit).

Step 3: All communications streaming back to headquarters (HQ).

Step 4: Once the all clear has been given, human resources are deployed with the unit becoming the command center.

In further embodiments, the present application provides a deployable surveillance, security and/or enforcement unit, comprising: a container configured for deployment from a vehicle or by air at a surveillance, security and/or enforcement location; and two or more removable modules having equipment for performing surveillance, security and/or enforcement operations, wherein the container has a housing with at least one opening for receiving the two or more modules into the container. The unit may be a building that may be temporarily deployed to a location, a vehicle, part of a vehicle, or a trailer. In some cases the unit may be deployed long term. Although in embodiments there are two or modules, in some embodiments one or modules may be used. In an example, the container is sized for human occupancy, and may a shipping container. Security and surveillance includes monitoring for any threats or dangers, such as to human health or the safety of infrastructure. Enforcement may mean, for example, identifying speeding cars or crime.

The two or more removable modules may comprise any two or more of the following: a command module for controlling other modules in the unit and/or sending communications to a remote location; a reconnaissance module for performing reconnaissance of the environment surrounding the unit; a sampling and diagnostic laboratory module for testing samples for chemical, biological, radiological and/or nuclear species; a decontamination module comprising a washroom for decontamination of personnel and/or equipment; and a utilities module for providing utilities and/or communications services to other modules in the unit. As mentioned above, in embodiments one or more modules may be used. The sampling and diagnostic laboratory may also be known as a sample testing and diagnostic laboratory, for example, if samples are collected by apparatus not forming part of the module. The utilities module may provide or supply power, include air conditioning apparatus for air-conditioning the modules, and may also include communications equipment for transmitting and receiving communications between the modules and external locations by wired or wired connection.

The container may comprise doors for opening for receiving the one or two or more modules. In an example, the doors are arranged such that at least one complete face of the container can be opened to form the at least one opening for receiving the one or two or more modules.

Each of the modules may comprise lifting pads for receiving the forks of a fork lift truck for lifting the module into the container.

The container may be adapted to be deployed at a surveillance, security and/or enforcement location by air from a helicopter.

The container may be provided in accordance with one of the following:
configured without wheels for deployment by air; configured without wheels for deployment from a land vehicle by crane; configured with wheels as a trailer for land based deployment by being towed; or configured with wheels and motive drive to be deployed by driving.

The container may have ruggedized metal faces, for example to withstand attack by persons or crowds. The container may be a shipping container modified for installation of the modules. The container may have tracks or rails fixed to the floor of the container to guide the loading of modules into the container.

The container may comprise a plurality of cameras for monitoring the surroundings of the unit. The cameras may be mounted on the container.

One of the two or more modules may be a reconnaissance module and may comprise at least one of: a robotic arm configured to move a surveillance, security and/or enforcement device to a position to monitor a target location proximal to the unit; and an unmanned aerial vehicle for launching from the reconnaissance module for performing surveillance, security and/or enforcement activities remote from the unit. The target location may be at a distance from the device.

The one of the two or more modules may be a reconnaissance module and may have a robotic arm comprising a base and an end effector, the base may be coupled to the reconnaissance module, the end effector may be arranged to receive one of one or more surveillance, security and/or enforcement devices and the robotic arm may be configured to move the device to a position to monitor a target location.

The deployable surveillance, security and/or enforcement unit may further comprise an array of docks or docking ports for receiving and storing the one or more surveillance, security and/or enforcement devices, wherein the robotic arm may be configured to maneuver the end effector towards the dock array to engage one of the surveillance, security and/or enforcement device.

The surveillance, security and/or enforcement devices may comprise two or more devices having different functions, the functions include at least two of: a camera configured for collecting images and performing facial recognition of persons in the images; a camera configured for collecting images and performing number plate recognition of vehicles in the image; a speed sensor for detecting the speed of vehicles passing through a target zone; and one more cameras for collecting images 360° around the unit.

One of the surveillance, security and/or enforcement devices may have multiple functions and comprises a plurality of sensors for facial recognition, number plate recognition and speed sensing, the plurality of sensors may be evenly distributed azimuthally around a central axis.

The one of the surveillance, security and/or enforcement devices may further comprise one or more cameras for collecting images covering 360° around the unit.

The surveillance, security and/or enforcement devices may comprise: one or more sensors for detecting one or more of chemical, biological, radiological or nuclear hazards.

The two or more surveillance, security and/or enforcement devices may have different functions; the functions may include one or more of: a UAV servicing application module; a chemical detection module; a biological detection module; and a camera/video surveillance module.

The base of the robotic arm may be mounted to a lifting platform for raising the robotic arm through an aperture in the roof of the container to enable a surveillance, security and/or enforcement device to monitor the target location. For example, this may be such that the device is outside of the container, and may include at least part of the robotic arm being outside the container. The lifting platform may comprise a scissor lift.

The robotic arm may, for example, have six-axes of movement. The robotic arm, at full extension, may be longer than the width of the container and is arranged to extend to move the surveillance, security and/or enforcement device to a position beyond the width extent of the container. For example, this may be so as to be able to view or sense around a building, tree, or other object, or for example to see around a corner. In some arrangements this may be possible with a shorter robotic arm.

The deployable surveillance, security and/or enforcement unit may further comprise one or more drones or unmanned aerial vehicles (UAVs) for launching from the reconnaissance module for performing surveillance, security and/or enforcement activities remote from the unit.

The container may, for example, have an aperture in the roof through which the UAV or drone may be launched.

The reconnaissance module may comprise a landing pad on which the UAV is stationed prior to launch, the UAV is powered by a battery and the UAV is adapted to recharge the battery when on the landing pad.

The drone or UAV may further comprise a camera or sensors arranged for collecting surveillance, security and/or enforcement data. The UAV may comprise a memory and a processor configured to be programmed to control the UAV to fly a predetermined flight route and collect surveillance, security and/or enforcement data. The UAV may be configured to be controlled or flown from a command module in the unit or from a control center at a remote location.

The reconnaissance module may comprise a plurality of UAVs and the plurality of UAVs may be stored in the reconnaissance module in a drawer system, each drawer may comprise a landing pad for a UAV, each drawer may be arranged to slide in and out of a cabinet of the drawer system, the drawers when in a closed position in the cabinet are arranged vertically above each other. The container may have an aperture in the roof for launch of the UAVs, the aperture positioned above the position corresponding to that of an open drawer of the drawer system. The drawers of the drawer system may be configured as cassettes, for example in tower storage.

One of the two or more modules may be a sampling and diagnostic laboratory module comprising test equipment for testing for chemical, biological, radiological, and/or nuclear species, for example, for hazardous species.

Closing all doors of a module or container may seal the module or container. The container may comprise an aperture in the roof, and the sampling and diagnostic laboratory may comprise one or more unmanned aerial vehicles (UAVs) for launching through the aperture in the roof of the container, the one or more UAVs comprising apparatus for sampling an environment around the UAV. The environment for sampling may be the atmosphere, air, or a surface in the surroundings that the UAV can fly to, and or land on if a surface.

The sampling and diagnostic laboratory may further comprise a robot programmed to take the environmental sample from the UAV and submit the sample to a selected one of the test equipment for testing for specified chemical, biological, radiological, and/or nuclear species. The robot may be configured to be controlled from a location remote from the container. The UAV may include recharging on a landing pad, live data feeds, and/or individual flight paths as well as any other features discussed above for the UAVs of the reconnaissance module.

One of the two or more modules may comprise a washroom for decontamination of personnel from chemical, biological, radiological, and/or nuclear hazards, the washroom may comprise a tank for storing water for washing the hazard from the person.

One of the two or more modules may be a command module for controlling other modules in the unit and may comprise communications apparatus for sending or receiving communications from a remote location.

The communications apparatus may be configured for communicating with one or more other deployable surveillance, security and/or enforcement units.

The unit may communicate with other units forming a network of units at a surveillance, security and/or enforcement venue.

In embodiments, the present application further provides a method of surveillance, security and/or enforcement, comprising: deploying a surveillance, security and/or enforcement unit at surveillance, security and/or enforcement location; assessing the environment surrounding the surveillance, security and/or enforcement location using automated unmanned modules provided in the unit; sending data produced from the step of assessing to a manned remote location; and deploying human resources to the surveillance, security and/or enforcement location, including human resources to operate a control module in the unit. The surveillance, security and/or enforcement unit may be that described above.

In embodiments, the present application further provides a deployable surveillance, security and/or enforcement unit, comprising: a container configured for deployment from a vehicle or by air at a surveillance, security and/or enforcement location; and one or more removable or fixed modules having equipment for performing surveillance, security and/or enforcement operations.

Detailed embodiments of the present application may further provide surveillance, security and enforcement management that can be used to perform a multitude of tasks, including the surveillance and collecting of data via modules attached to the robotic system management equipment, for example surveillance (CCTV) cameras, facial recognition camera, speed camera, video streaming cameras, a GPS receiver, RFID reader, drone launcher, or applications developed by a third party contractor which has been configured to transmitted or receive data. A cabin serves as a mobile command center and communications hub for the security vehicle.

These tasks as mentioned above are normally carried out in stealth so as not to be noticed by the general public.

In further embodiments, the present application provides a surveillance, security and/or enforcement unit comprising a robotic arm, the robotic arm having at least six axes of movement and comprising a base and an end effector, the base being coupled to the unit and the robotic arm arranged to perform a surveillance, security and/or enforcement function, wherein the surveillance, security and/or enforcement unit is configured for deployment from a vehicle or as a vehicle, at a surveillance, security and/or enforcement location. The unit may be a trailer or part of a vehicle. For example, the trailer may be detachable from a cab, drive unit, or tractor which provides the driving force to mobilize the unit and provides the ability to deploy the unit at locations. The unit may also form the load, payload or bed of a low-loader or flat-bed truck or lorry, and may be decoupled from the truck or lorry to provide a fixed non-wheeled unit after deployment at the desired location. The six axis robotic arm has the advantage of greater maneuverability such that a surveillance device can be positioned to look around objects which would normally block a view. The arm may even be used to look around corners. Furthermore, the end effector provides flexibility in the type of camera or other surveillance device employed for the situation.

The surveillance, security and/or enforcement unit may be adapted to engage a function module for performing the surveillance, security and/or enforcement function, and the function module comprises at least one of a video camera, stills camera, vehicle speed camera or radar. A number of modules may be stowed in the unit for interchanging on the end-effector of the robotic arm. The modules and/or various cameras may include different lenses, night vision cameras or attachments, 3D cameras and/or 360° full surroundings camera systems. The later may comprise an array of 3 or more cameras which when the data from them is combined provides a full 360° feed from the location.

The function module or surveillance data processing equipment may be arranged to perform any one or more of: facial recognition, vehicle number plate recognition, and vehicle speed determination. That is the processing may be performed at the end-effector, in a cabin of the unit, or at a remote data processing location.

The surveillance, security and/or enforcement unit may further comprise a cabin having communication means for transmitting and receiving surveillance data from a function module coupled to the end effector and further comprising surveillance data processing equipment. The cabin also provides a space for locating personnel such that their activities and monitoring are hidden from view.

The data processing equipment may include a controller configured to control the robotic arm to position the end effector at a desired position and orientation to perform surveillance of a selected area or areas. The selected area or areas are selected based on information comprised in the received surveillance data.

A headquarters may be at a fixed location remote form the unit or in another unit. The surveillance, security and/or enforcement unit may further comprise communication means for communicating with one or more deployable units and/or a headquarters/command center to receive surveillance data from said one or more deployable units and/or a headquarters/command center, and to process said received data.

The data processing equipment may include a controller configured to control the robotic arm to position the end effector at a desired position and orientation to perform surveillance of a selected area or areas. The control may, for example, be automated based data received, but may be manual.

The selected area or areas may be selected based on information comprised in the received surveillance data.

The surveillance, security and/or enforcement unit may further comprise a launch platform for launching an unmanned aerial surveillance vehicle adapted to communicate with the surveillance, security and/or enforcement unit.

The surveillance, security and/or enforcement unit may further comprise a safety housing or turret for at least partially enclosing the robotic arm. The safety housing or turret may be dome-shaped, spherical or cylindrical and may be arranged to rotate as the robotic arm rotates in the horizontal plane. The safety housing or turret may also perform a screening function for at least partially hiding the robotic arm from view when not in use.

A surveillance, security and/or enforcement system comprising: the surveillance, security and/or enforcement unit set out above, and further comprising a launch platform for launching an unmanned aerial surveillance vehicle adapted to perform surveillance of areas beyond the vision range of the surveillance, security and/or enforcement unit and communicate with the surveillance, security and/or enforcement unit.

According to embodiments of the present application, there is provided a surveillance, security and enforcement management vehicle comprising a robotic arm, as disclosed in claim 1. The robotic arm has a base and an end effector at the opposite end, and can move about by six axes of motion. The base of the robotic arm is coupled to vehicle or vehicle removable trailer or flatbed bed comprising the vehicle. The vehicle is then able to perform a variety of surveillance, security and enforcement management functions.

The main communication and control hub is located within a cabin located on the vehicles platform, (Flatbed or trailer) which houses the robotic controller, computers and video display screens and PLC HMI (Human Mechanical Interface for PLC and robotic addition controls) and a setting area.

The vehicle has the advantage that it is able to perform surveillance, security and enforcement management functions, for example the versatility of the six axes robotic arm means that the traffic management vehicle can be adapted for use for many different functions. A six axes robotic arm may comprise a base, a main arm, a forearm and an end effector. There are 3 couplings between these four components. Through the four components and three joints provided are six independent modes of movement, or degrees of freedom. A six axes robotic arm has the advantage over other types of robotic arms of having a high speed of movement and being capable of reaching any position within the envelope of movement of the arm.

In an example, the robotic arm is maneuverable in order to position the end effector in a plurality of positions inside and outside the vehicle and may by coupled to the vehicle on a guiding track to allow translational motion of the robotic arm across the vehicle, such as form one side of the vehicle to the other.

In an example, the vehicle has a control unit which controls the robotic arm based on data received from at least one data source. The data source could be a surveillance (CCTV) cameras, facial recognition cameras, number plate recognition cameras, video streaming cameras, a GPS receiver, RFID reader, drone launcher and lander, or applications developed by a third party contractor which has been configured to transmitted or receive data sent from other security systems.

In an example, the data source is at least one of a video camera, a GPS receiver, RFID reader, CAD software, a map or a plan received from an external command center (Head office).

In further embodiments, the application further provides a surveillance, security and enforcement vehicle as set out above. The vehicle is coupled to a six axes robotic arm and further comprises a control unit. The control unit controls the robotic arm for CCTV or enforcement (Civilian or Government Contract) environment based on data received from at least one data source.

In an example, the data source is at least one of a data source could be a surveillance (CCTV) cameras, facial recognition cameras, number plate recognition cameras, video streaming cameras, a GPS receiver, RFID reader, drone launcher and lander, or applications developed by a third party contractor which has been configured to transmit or receive data sent from other security systems. The application provides still further a surveillance, security and enforcement management method according to claim 24. The surveillance, security and enforcement management method comprises controlling a six axes robotic arm coupled to a vehicle to perform surveillance, security and enforcement management function.

Finally, in embodiments, the application provides a computer program as set out above to perform the surveillance, security and enforcement management method of controlling a six axes robotic arm coupled to a vehicle or vehicle removable trailer or flatbed.

Embodiments of the application provide: Fully automated robotic Security system configured for
    Full flexibility and movement via the ABB or other six axis robotic system
    Secure automation response
    Interchangeable robotic modules
        Scalable for new applications
        Accuracy of 0.05-0.08 mm
        10-1500 kg (or 60-500 kg) Payload
    Surveillance cabin
    Removable from the vehicle allowing for a long-term static flexible surveillance and command centre
    0-360 degree+HD RealTime video streaming cameras
    0-360 degree+facial recognition cameras
    0-360 degree+(or 0-180 degree) number plate recognition cameras
    0-360 degree+(or 0-180 degree) Speed cameras
    Vehicle to Vehicle data streaming
    Vehicle to HQ data streaming
    HQ remote offsite robotic activation
    Platform for launching and landing aerial drones The robotic system is programmable which enables integration into other applications, and allows for additional modules to be added to the system.
    In embodiments, the system includes
    Optional Mercedes Econic truck or other—for transporting the RRSP-SV system
    ABB IRB (or other industrial robot) robotic system—to handle the modules assigned to surveillance application
    HMI (Human Mechanical Interface) easy to use software interface (Robotic and PLC controls)
    Optional truck mounted 7th axis for the SV robot—allowing for the movement of the robot left and right or down the length of the truck bed
    In embodiments, the solution features
    Automatic and automated detection of objects assigned
    Able to adapt to new technologies (Programmable docking/undocking modules)
    Flexibility for civilian or government contracts
    Full range of robotic movement for the best application result
    Further features include:
    Facial Recognition
    0-360 Deg HD Streaming
    Number Plate Recognition/Speed control
    Additional Modules can be added
    Data Live Feeds between vehicles/units
    Remote Robotic Control (Ability to activate any module within the Surveillance)—HQ authorized
    Platform for launching and landing aerial drones—HQ authorized
    Surveillance unit includes
    Communication Centre housed in cabin of unit:
    ABB or other industrial Robot:
        Accuracy of 0.05-0.08 mm
        10-1500 kg (or 60-500 kg) Payload
    Safety Robot housing:
    Docking Unit (Multiple Units)
    Manned or Unmanned (Run via HQ or another SV system) the robotic application are fully functional
    In embodiments, surveillance unit is comprised in
    Removable trailer for long-term surveillance or venues. This allows the truck/motive power to be used on another assignment.
    Robotic arm:
    Full range of robotic motion (For safety only while the vehicle is stationary)
    Docking plate allows for interchangeable module to be used for Civilian or Government contracts
    Proven market need driven by
    Security and surveillance
    availability of significant operational and financial efficiencies for users.

BRIEF DESCRIPTION OF THE DRAWINGS

Embodiments of the present application will now be described with reference to the accompanying drawings, of which:

FIG. 5a is a diagram of a robot system for use in a sampling and testing module;

FIG. 5b is an illustration of the testing module according to the present application, in which the robot system of FIG. 5a may be implemented;

FIG. 6a is an illustration of a reconnaissance module according to the present application;

FIG. 6b is a diagram of a robotic arm for use in the reconnaissance module of FIG. 6a;

FIG. 7 are diagram of cameras and images tools for implementation as part of the reconnaissance module of FIG. 6a;

DETAILED DESCRIPTION

As set out above, conventional surveillance measures often fall short of the needs of the surveillance user by being either too costly, such as extensive permanent solutions, or provide insufficient coverage or data pertaining to a location.

The subject matter of the present application provides a flexible solution that can be configured and deployed in a form adapted to the specific location and surveillance requirement.

Figure 1A:
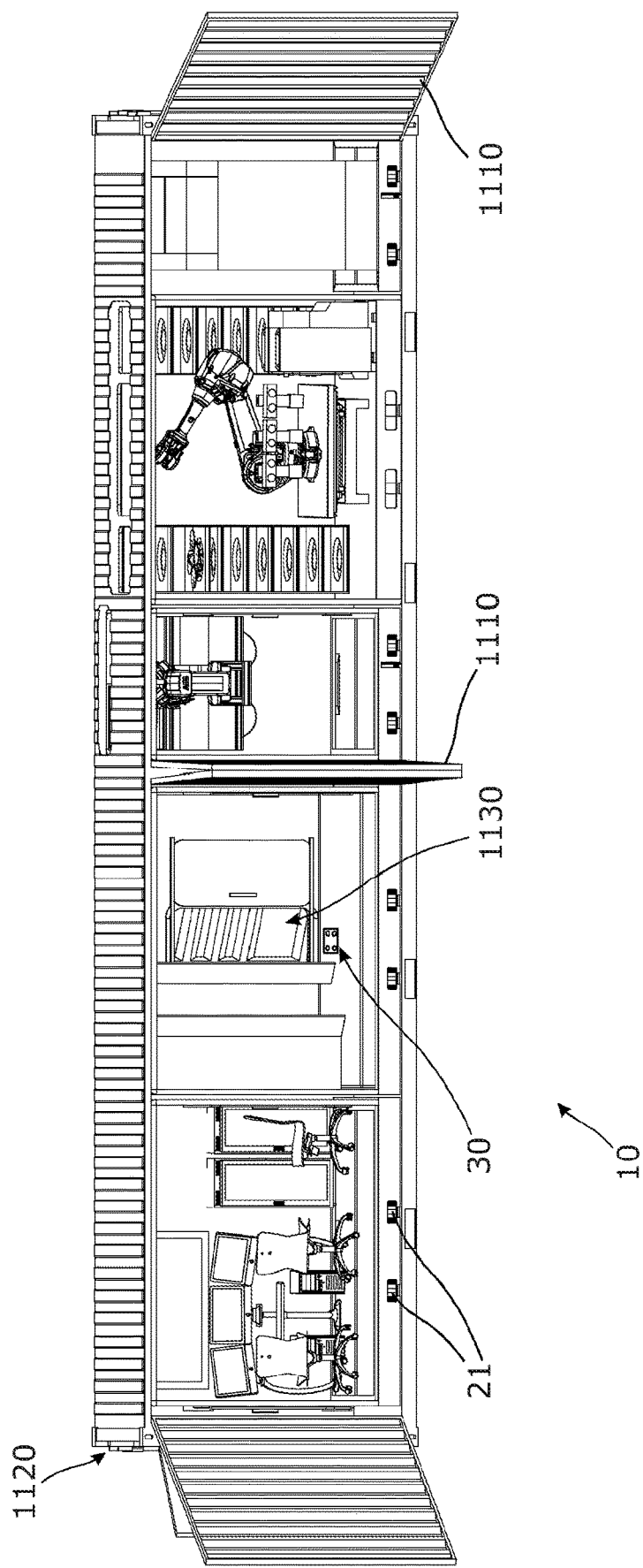
FIGS. 1a and 1b are illustrations of a modular surveillance, security and enforcement unit according to an embodiment of the present application, shown in FIG. 1a with modules in a container and in FIG. 1b without the container.

FIG. 1a shows a deployable surveillance, security and/or enforcement unit 10.

Figure 1B:
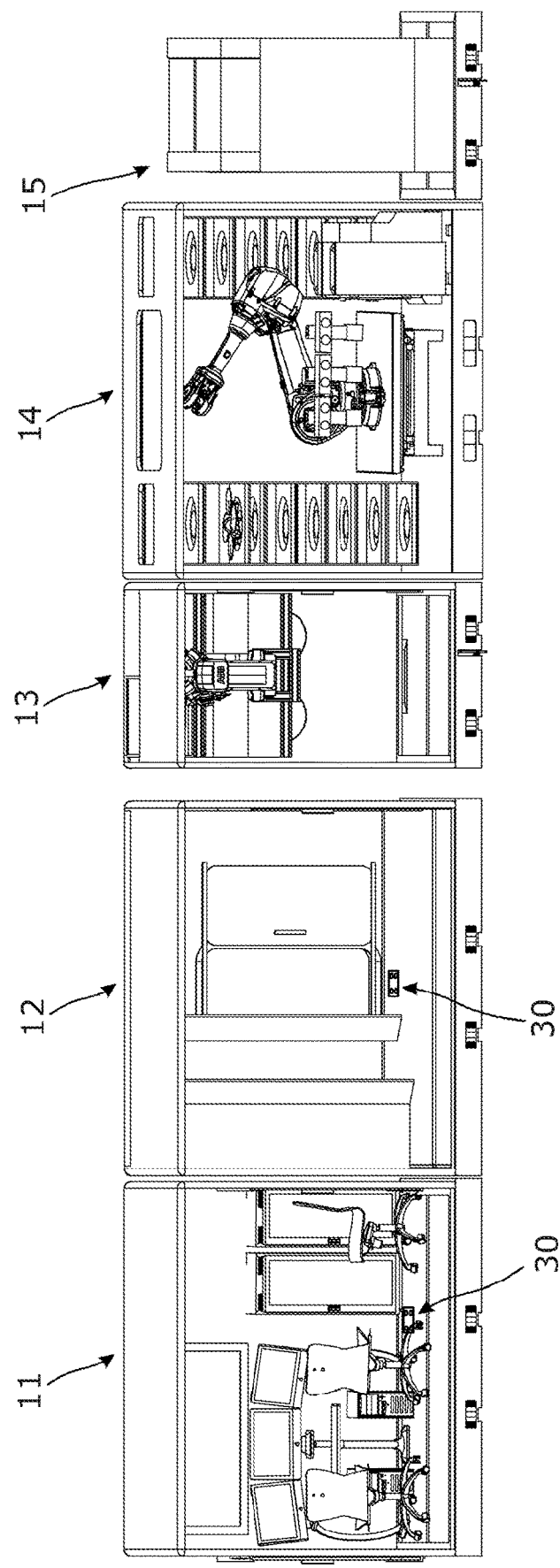
Figure 2A:
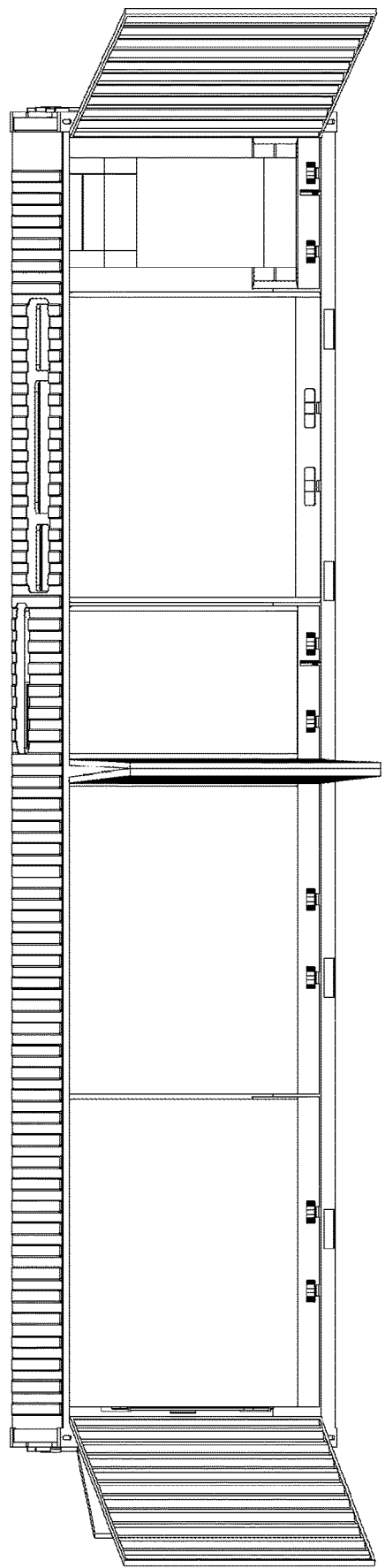
FIGS. 2a and 2b are illustrations of the exterior of a container in which the modular units of FIG. 1b may be implemented.
Figure 2B:
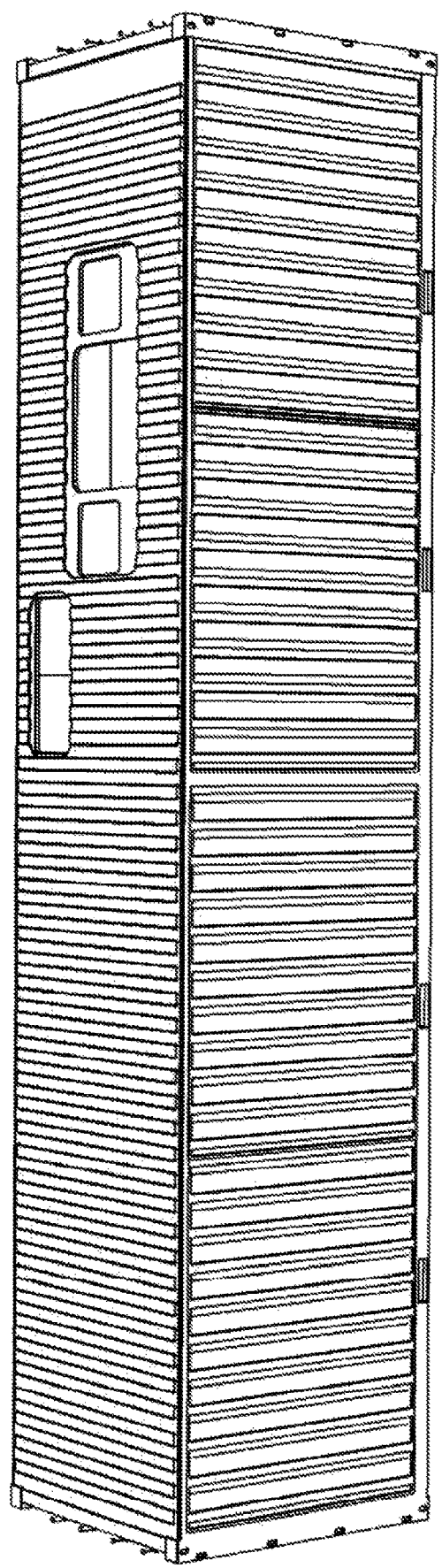

The unit 10 is formed of a container, which may for example be a shipping container such as a 40 foot (12.19 meters long) shipping container. FIG. 1a shows five modules 11-15 installed in the container 10. Other numbers of modules may be installed in the container. FIG. 1b shows the modules without the container present. FIG. 1b is provided to show an unhindered view of the modules. FIGS. 2a and 2b show external views of the container 10 with doors open (FIG. 2a) and doors closed (FIG. 2b). FIGS. 2a and 2b show the front view of the container. The rear view of the container (not shown) would be similar but may have different doors or no doors at all. The container includes a housing which may be comprised of the walls, floor and roof of the container. The unit 10 has metal walls which are robust and provide strength and ruggedness. The container may, for example, be strong enough to be able to be stacked on top of one another, such as is usually the case for conventional shipping containers. As shown in FIGS. 1a and 2a the container 10 may include multiple doors or openings. FIG. 1a shows conceptually five modules in the container. The modules are configured to be removable. The modules are built outside of the container and subsequently loaded into or installed in the container.

Although FIG. 1a shows the unit 10 equipped with five modules, the unit can be provided with other numbers of modules as required to meet customer requirements or location demands. For example, only one of the modules, such as module 14 may be included, or two, three or more modules may be included. In an example, each of the modules included is different but it may be envisaged that multiple units of the same type may be included. Furthermore, other sizes of container may be used to include more or less modules within.

In the embodiment of FIG. 1a the five modules are all different and include: a command module 11, a decontamination module 12, a sampling and diagnostic laboratory module 13, a reconnaissance module 14 and utilities module 15. The housing of the container may be adapted to permit loading and installation (docking) of the modules within the container. For example, as shown in FIGS. 1a and 2a one or more complete side faces of the container may be fitted with doors to provide an opening for installation of the modules. The container may have the conventional two end doors located at 1120 of the container (not shown), as well as four larger doors 1110. The four larger doors 1110 together allow the full length of the long side of the container to be opened. This allows the modules to be loaded into the container, for example, by fork lift truck. It can be seen in the figures that the base of the modules is provided with tracks 21 or truck fork openings to accommodate the lifting forks of such trucks. Tracks which may comprise rails may instead be provided fixed to the floor inside the container. The rails may be provided as a pair to support each module and each module may have feet to engage or slide along the rails. The rails may aid and guide sliding of the module into the container and may also be used for fixing the module into the container. The rails may be aligned across the container such that the modules may be slid in from the side of the container. The spacing of the pair of rails may be different or the same for different sized modules, or may be adjustable. Once loaded the modules may be fixed in the container by locking pins or other fastening means.

Connection of utilities to each module may be provided by a docking mechanism. This may for example be the same or similar to the docking plates shown in FIG. 14, which are described in more detail below. Such a docking mechanism may comprise upper and lower plates that engage and once engaged all required utilities are connected from the container to the module. The utilities provided may be those provided by utilities module 15, which may include power, air-conditioned air, water, and communications. Each module may comprise an upper plate 30 such as shown in FIGS. 1a and 1b in the base of the module. The container may comprise a lower plate which engages or docks with the plate 30 of the module when the module is loaded into the container.

Returning to FIG. 1a, two of the doors 1110 are hinged at the ends of the container and two at the midpoint of the long side of the container. This arrangement conveniently permits two larger size modules and three smaller size modules in each half of the container. Other positioning of the hinges is possible, and other sizes of module are possible. The container may also comprise additional openings or doors specific to the requirements of each module. For example, the container 10 may comprise an additional door for human entry into the module 12 from the rear face of the container. The actual arrangement and positioning of doors may be different to that shown in the figures.

Figure 8:
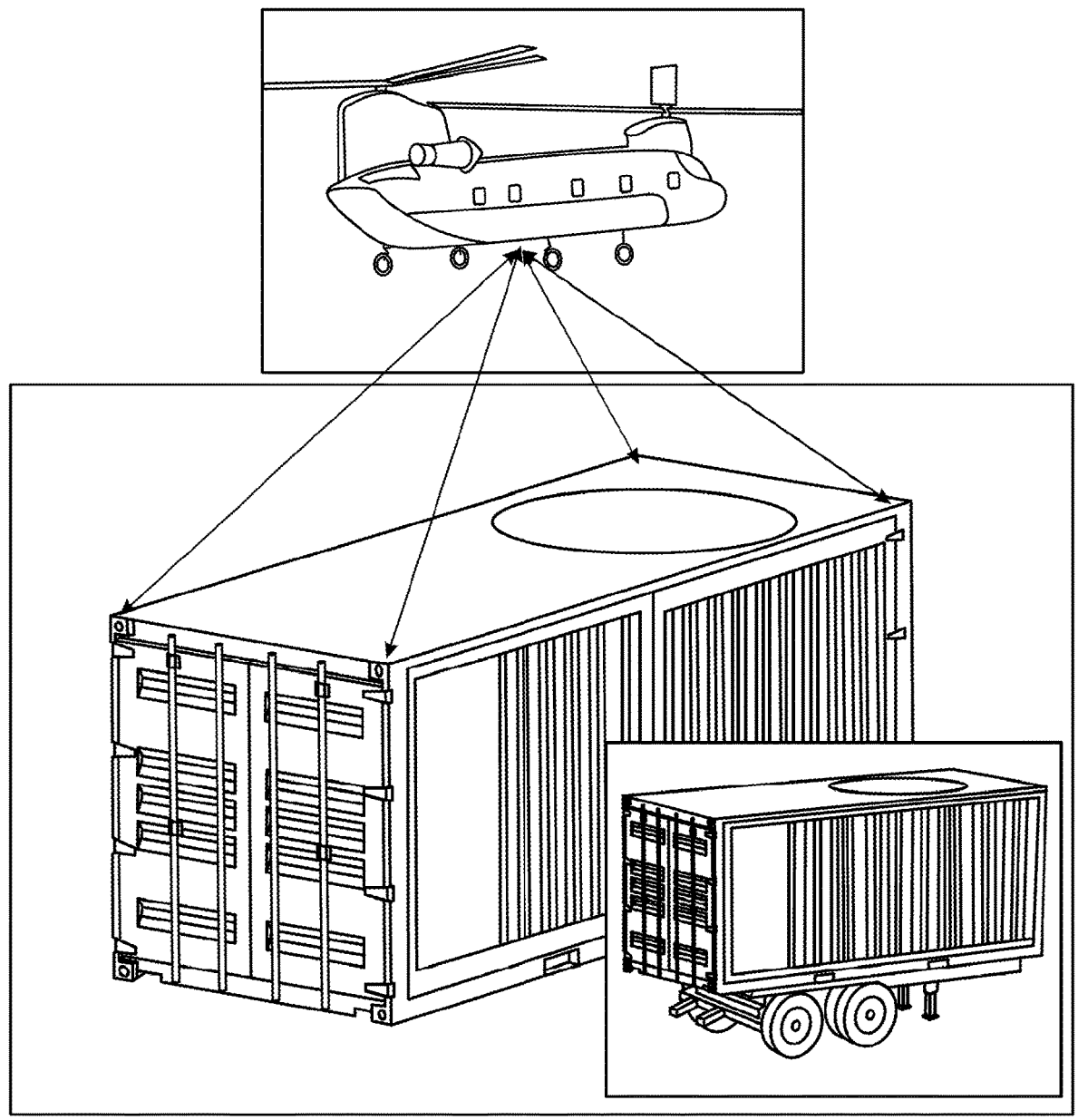
FIG. 8 is a schematic illustration showing methods of deployment of the surveillance, security and enforcement unit according to embodiments of the application.

The unit 10 may be adapted to be deployed by road or air vehicle. For example, as shown in FIG. 8 the container may be equipped with lifting points on the roof of the container. These lifting points allow attachment of chains or cables which can then be attached to a lifting device. In FIG. 8 a heavy lift helicopter is shown lifting a unit. Additionally or alternatively, the unit 10 may be deployed by road. As another example shown in FIG. 8, the unit may be provided as part of a wheeled trailer. Such a trailer may be towed by the motive power unit of a truck or lorry and decoupled from the motive power unit when delivered to the desired location. This allows the motive power unit to be used on another assignment. In a further example the motive power unit may be permanently coupled to the container as part of the unit. In a yet further arrangement the container may be delivered on a truck or lorry but lifted from the truck or lorry when at the desired location by use of a crane or other lifting means.

In such a case, lifting points again will need to be provided, such as on the top of the container, for example at the four corners.

The modules are configured so that they can be removed from the container and exchanged for a different module providing different functionality. This ability to swap modules at any given time allows the unit to be redeployed in the field rapidly. As technology, such as cameras and sensing technology, improves the modules can be easily removed and replaced with upgraded modules. This ability to upgrade provides cost savings to the customer because the unit can be upgraded and used again many times.

As mentioned above, the container and modules are sized such that a plurality of modules fit within the container. Although each module may be manned or unmanned it is preferable that each module is sized for human occupation, that is, sized to accommodate a person standing. Each module may connect to an adjacent module by having doorways such that a person can walk from one module to another. Since modules are interchangeable the doorways may, for example, be located at the same position in each module so that when placed next to an adjacent module, the doorways are aligned. The module that is at the end of the container will have a door way that does not link to another module but this doorway can be used as a door way for accessing the modules from outside. In an example, that end door aligns with an external door of the container, such as one of the doors 1120 at an end of the container. At the other end of the container, the end module may have a door that is blanked off.

The modules may be sealed by closing doors between and for entry in to the modules. The sealing may be hermetic sealing or sealed to prevent hazardous materials entering, sometimes known as "hazmat" type sealing because of the suits of that name. The modules may be sealed separately or collectively in this way, so as to prevent hazardous materials entering. In the case of hermetic sealing nothing is allowed to enter or exit. The sealing of modules is most preferable for the decontamination chamber. It is also possible for other modules namely, the command module 11, sampling and diagnostic laboratory module 13, and reconnaissance module 14. However, as discussed below the sampling and diagnostic laboratory module 13 and reconnaissance module 14 may have doors for launching of drones or a door for a robotic arm to be deployed through. Hence, maintaining sealing when these doors are opened will not be possible. As discussed above, the utilities module may provide air-conditioning to the other modules. To provide "hazmat" type sealing the air-conditioning includes filtration to filter out known hazardous materials.

Figure 3:
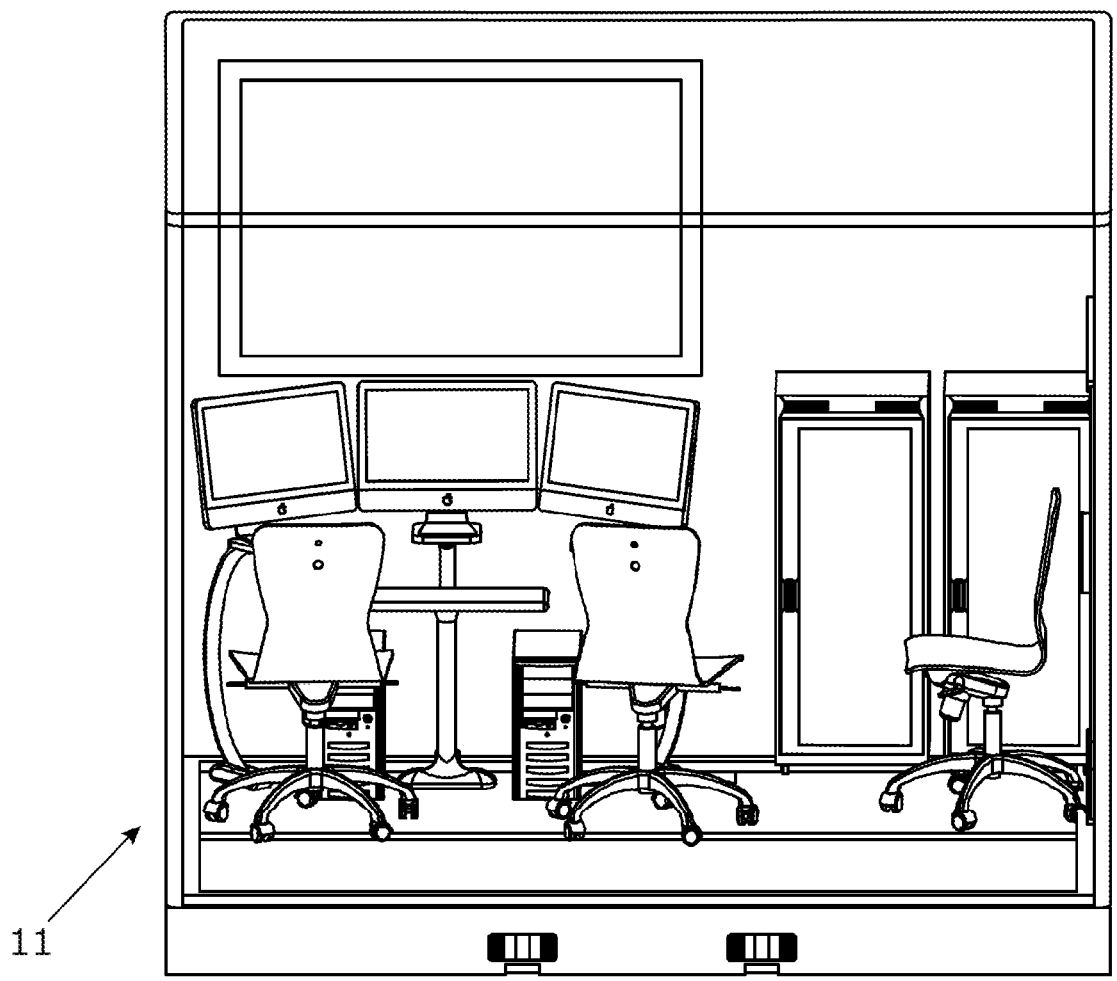
FIG. 3 is an illustration of a command center module according to an embodiment of the application.

Returning to FIG. 1a, 1b and referring to FIG. 3, the command module 11 is shown as the left most module in FIGS. 1a and 1b. The command module 11 comprises computing and data processing resources which may receive data from other modules in the unit and process the data. The command module may be configured to control resources in other modules in the unit. The unit may be manned or unmanned. If the module is unmanned the command module 11 may be controlled remotely from a command headquarters. Alternatively the command module may be controlled from another unit 11.

Figure 4:
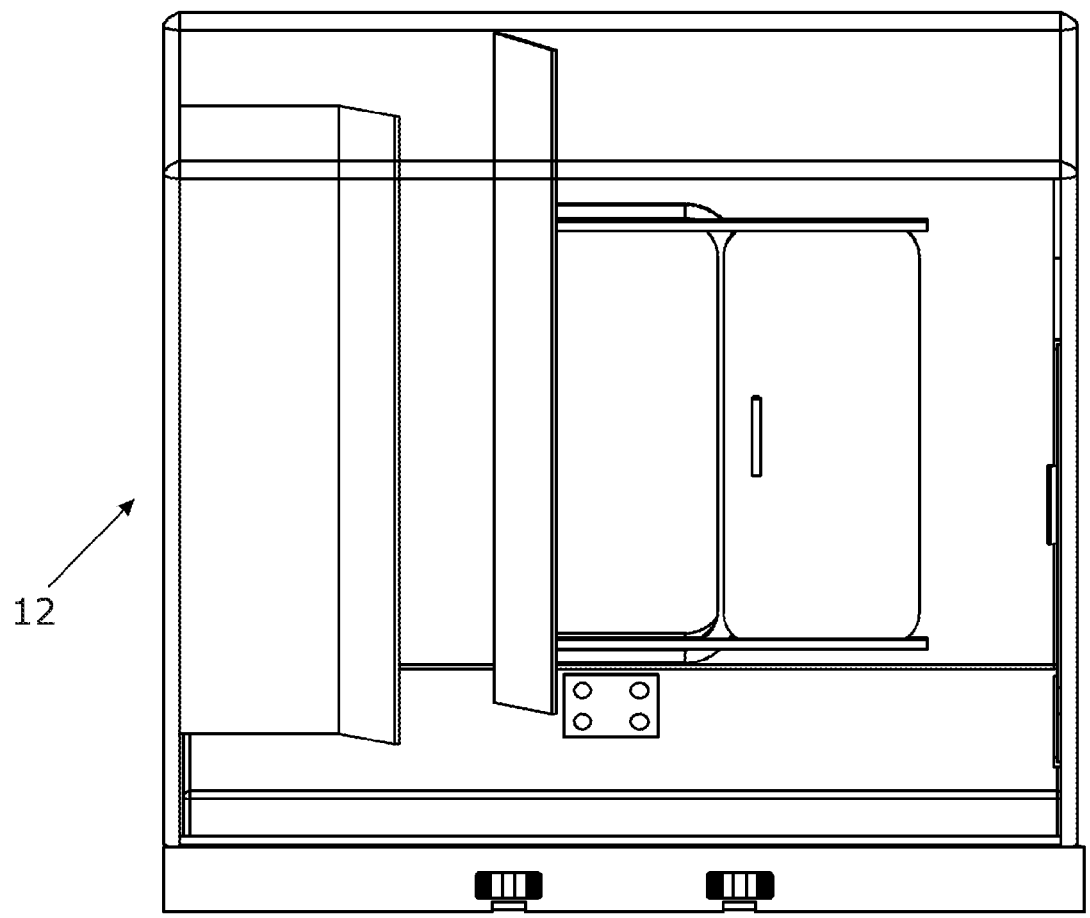
FIG. 4 is an illustration of a decontamination module according to an embodiment of the application.

FIGS. 1a, 1b and 4 show a decontamination module 12 which comprises resources for decontaminating personnel and equipment from chemical, biological, radiological, and/or nuclear hazards which persons may have come into contact in the environment surrounding the container. The decontamination module 12 may comprise a washroom for rinsing the hazards from the personnel. The washroom may also be used for decontaminating equipment, such as portable equipment. The module may comprise a tank, such as a 1000 liter tank, for supplying fluid for rinsing. The fluid will usually be water but may be supplemented by other substances as required for the specific hazard. In some circumstances fluids other than water may be desirable. In such cases the alternative fluid may be used instead of water and stored in the tank, or a secondary tank may be used for the alternative fluid. The tank may, for example, be mounted on top of the container, but may alternatively be mounted in the decontamination module or, if space permits, under the container.

FIGS. 1a, 1b and 5b show sampling and diagnostic laboratory module 13. FIG. 5a shows a robot 22 that may be used to automate the testing performed in the module 13. The module 13 may be used for testing for samples for chemical, biological, radiological and nuclear (CBRN) species such as may be hazardous to human health or indicative of an explosive device. The module 13 is provided with test equipment to perform such testing. The module may also be provided with the robot or robotic system for manipulation of parts and equipment. The module may also comprise one or more unmanned aerial vehicles (UAVs) or drones for sampling the environment in the vicinity of the unit. The sampling may collect samples of the air or from a surface. The UAV may be launched from the module to collect samples up to the maximum range the drone can fly from the module on a single charge of its battery. This may be up to 16 km, but may also be used to collect samples close to the unit, for example when the module is unmanned. Each UAV may be programmed to follow its own flight path, which may be performed by a programmable unit on-board the UAV. Each UAV can be flown separately or individually along a specified path. In one arrangement each drone may cover a region or zone in the area surrounding the unit. The UAVs may also or alternatively be flown remotely by an operator, for example located remotely at a headquarters or an operator in a command module of the unit. As well as being able to collect samples the UAVs may also be provided with limited on board testing capability. The UAVs are fitted with radio communication means to communicate data from the on board testing back to the module 13. These communication means may include live data feeds. The module itself may also be fitted with communication means such as a radio transmitter for communicating live data to a remote headquarters.

The module is provided with a landing pad for each UAV. For example, as shown in FIG. 5b the landing pad is mounted to a wall of the module at a high level close to the test equipment. The UAVs are battery powered and the battery is automatically recharged when the UAV is on the landing pad. This automatic recharging may be achieved by the landing pad having electrical contacts which correspond with electrical contacts on the landing legs or feet of the UAV. Alternatively, a docking connector on the landing pad may be provided such that part of the UAV is guided to engage with the connector to enable recharging. In another arrangement an induction charger may be provided to transfer energy from the landing pad to the battery of the UAV.

The robot or robotic system 22 may be a two arm robot such as the YuMi robot from ABB. The robot is programmed to take the samples, for example in vials, on swabs or on other sample collection means, collected from the unit's surroundings and put them into the relevant testing apparatus. Once testing is complete the robot will remove them and dispose of or put the sample for storage as required. Use of the two arm robot will; enable the system to stay ahead of technology into the next century.

FIGS. 1a, 1b and 6 show reconnaissance module 14 which may be provided with tools for near and far-field reconnaissance from the unit. The near-field tools may comprise cameras and sensors for use with a robot arm 23. The far-field tools may be similar tools but provided mounted to unmanned aerial vehicles 25 (UAVs). In the embodiment shown in FIG. 6 there is a series of drawers 24 in a cabinet or tower store UAVs. For example, sixteen UAVs are stored in two towers of eight. Other numbers of UAVs may be stored such as 32. The drawers slide between open and closed positions. Each drawer 24 has a landing pad on which the UAV sits. When the draw is in the open position the UAV is able to launch vertically. An aperture in the roof of the container above the position of the open drawer allows the UAV to launch vertically upwards and out from the module and container to perform surveillance, security and/or enforcement activities. As set out above for the UAVs of the sampling and testing module the UAVs may be powered by a battery and may recharge the battery when on the landing pad. The options for recharging of these UAVs may be the same as set out above. The aperture in the roof of the container may comprise a door such as a motorized sliding door arranged to automatically open when the UAV is in the process of launching.

Similar to the UAVs described above they can be programmed to fly separate or individual flight paths, or may flown individually by an operator located in the command module or at a remote location. For example, each UAV may be programmed to follow its own security flight routine. Each UAV may be equipped with a camera or sensors for collecting surveillance, security and/or enforcement data. The camera may be a stills camera, video camera, heat detecting sensor or other sensor. Different UAVs may be equipped with different cameras or sensors, or depending on the payload they can accommodate multiple cameras or sensors. The UAVs may be configured to transmit data collected by the camera or sensor back to the reconnaissance module for analysis or further transmission to a remote headquarters. In some circumstances, the UAV may have a memory for storing the data such as when it is out of communications range from the module.

The UAVs 25 provide surveillance, security and/or enforcement activities at distances greater than can be provided by the cameras and sensors mounted at the module itself.

Near field surveillance, security and/or enforcement activities are provided by the robotic arm 23. The robotic arm is mounted to the module by a base 23a. The other end of the arm has an end-effector 23b for engaging with one of one or more various functional fittings as will be described later. The end-effector is the same or similar to that shown in FIG. 14 (described later) and comprises a pair of plates. The plates may be substantially the same as those described above for docking of the modules into the container. The robotic arm may have multiple axes of movement, for example six axes. A six axis robot arm may comprise two axes or movement at the base 23a or shoulder, two axes of movement at an elbow, and two axes or movement at the wrist which holds the end effector 23b. This arrangement provides a wide range of coverage of positions with high accuracy. An example of a six axis robot suitable for this purpose is the ABB IRB-6700, which has highly accurate placement (0.05-0.08 mm) such as may be required for automatic changing of the functional fitting at the end effector 23b, as well as a 60-500 kg payload for carrying heavy sensing and camera loads.

As shown in FIG. 6 the robotic arm 23 may have its base 23a mounted on a lifting device 26 to lift it such that the surveillance, security and/or enforcement device fitted at the end-effector is positioned out of, and clear from the roof of the container. As shown in FIG. 6 the lifting device 26 may lift a platform on which the base 23a of the robotic arm is mounted. The lifting device may, for example, be a scissor lift because this is compact and during vertical movement has minimal horizontal displacement. Other lifting devices may be used.

Figure 7:
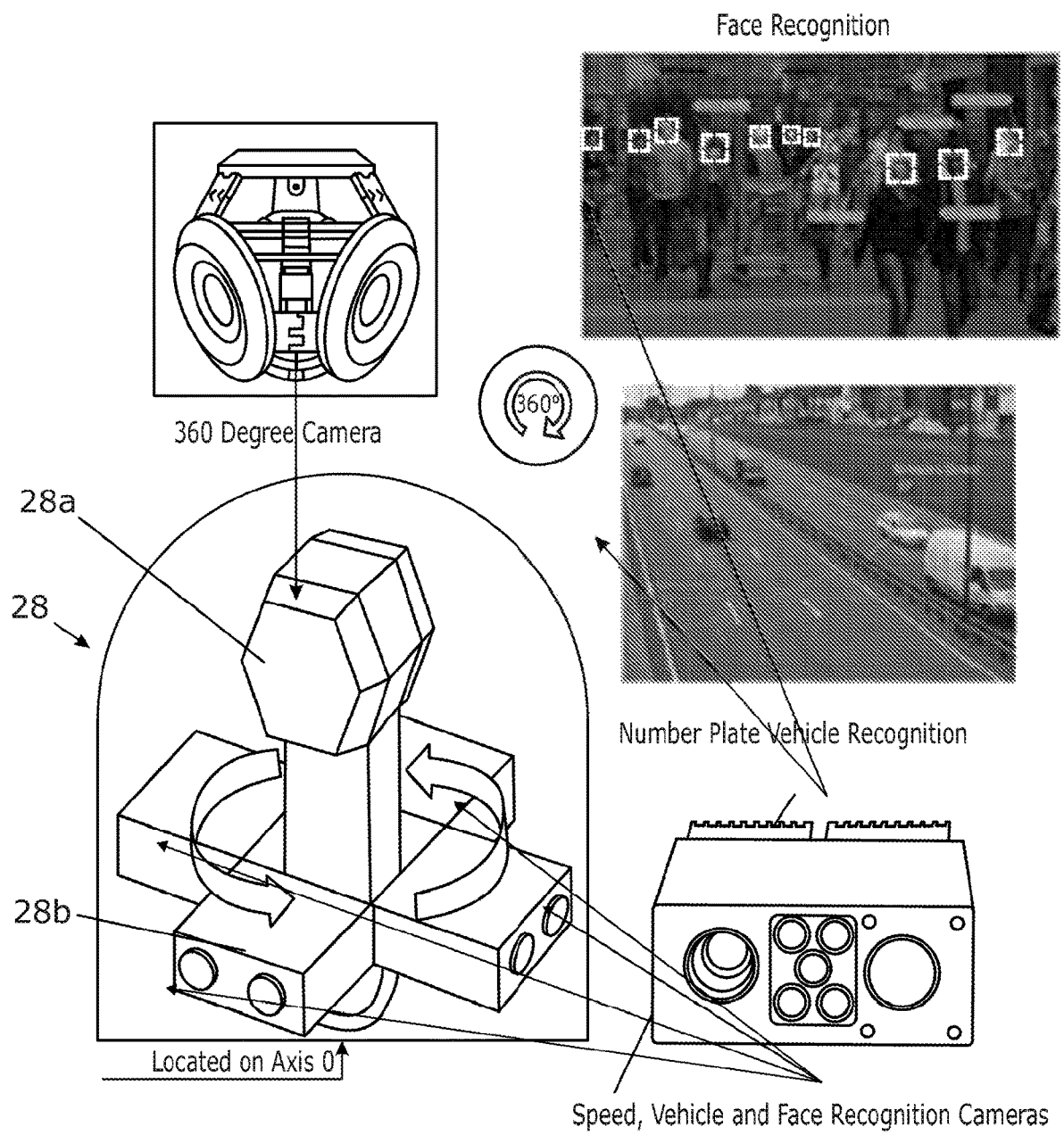

Adjacent to the robotic arm 23 may be providing a docking unit 27 or array with multiple devices that the robotic arm can pick up. FIG. 7 shows a number of possible fittings and/or devices that may be engaged by the end effector for performing a surveillance, security and/or enforcement activity. Clockwise from top-left in FIG. 7 are shown: a camera arrangement for capturing data to provide a 360° image around the container; an example of facial recognition software processing an image; an example of number plate vehicle recognition in progress; a camera unit for speed, vehicle and face detection/recognition; and a multiple camera device 28.

The multiple camera device 28 may comprise a 360° camera 28a for collecting images and is mounted on fitting member. Around the fitting member are located a plurality of camera units 28b each for speed, vehicle and face detection/recognition. These camera units are mounted equally spaced azimuthally around the fitting member to provide 360° coverage. When the end effector engages with a device the plate of the end-effector couples to a corresponding plate on the device. Once coupled communication and power are provided to the device. In the case of some modules, water or other utilities may also be provided to the device through the end-effector. The docking unit may also comprise other surveillance, security and/or enforcement devices that can be engaged by the end-effector 23b and positioned for respective activities by the robotic arm 23. These other devices may include video or and stills cameras, and cameras for performing the functions of: collecting images and performing facial recognition of persons in the images; collecting images and performing number plate recognition of vehicles in the image; a speed sensor for detecting the speed of vehicles passing through a target zone; and one more cameras for collecting images 360° around the unit.

Devices in the docking area may also be provided with sensors for detecting chemical, biological, radiological and nuclear species in the air immediately adjacent the container, or even on the roof of the container.

A further device that may be provided in the docking unit to be used by the robotic arm 23 may be a UAV servicing application module. This device is adapted to provide servicing and/or maintenance of the UAVs. The servicing may include light servicing such as cleaning the UAV, or for example, cleaning the cameras and/or sensors or the UAV. Cleaning may be necessary if the UAVs are operating for extended periods such as 24 hour surveillance missions. The module operates by picking up a UAV or drone, for example from one of drawers 24 and cleaning the cameras of the UAV. In an example, four devices provided in the docking area for use with the robotic arm 23 may be: 1 UAV servicing application module; 2 Chemical detection module; 3 Biological detection module; and 4 Camera/Video surveillance module.

These four modules provide a varied range of surveillance and servicing needs to cover most, if not all, scenarios that may be required by the unit.

The robotic arm 23 is used to move the selected device into a position above the container for performing surveillance, security and/or enforcement activities of a target location. Multiple target locations may be respectively monitored by repeatedly moving the device to different reconnaissance positions. The arm may be longer than the width of the container when fully extended to allow the device held by the end effector to look around obstacles and even around corners.

The module may be linked to the unit's user interface, such as in the command module for central onsite control or may be remotely controlled from a remote headquarters location. In some arrangements the robotic arm may be controlled in real time from an operator in the command module or at a location remote to the unit. In other arrangements the robotic arm 23 may be operated by a predetermined program to perform a surveillance routine, such as when the unit is unmanned.

FIGS. 1a and 1b show utilities module 15. Utilities module may receive and distribute utilities such as power and communications to the other modules in the unit. Alternatively, each module in the unit may receive power and communications individually. The utilities module 15 may include a generator for providing power to the modules during periods that power is not received from land based power providers, such as emergency or back-up power. When, for example, due to location no land based power is available the generator of the utilities module may provide power to all modules as their main source of power. The utilities module may include air-conditioning units which providing air-conditioning to the other modules, and/or may also air-condition the utilities module itself to maintain components therein at normal operating temperatures and avoid overheating.

Figure 9:
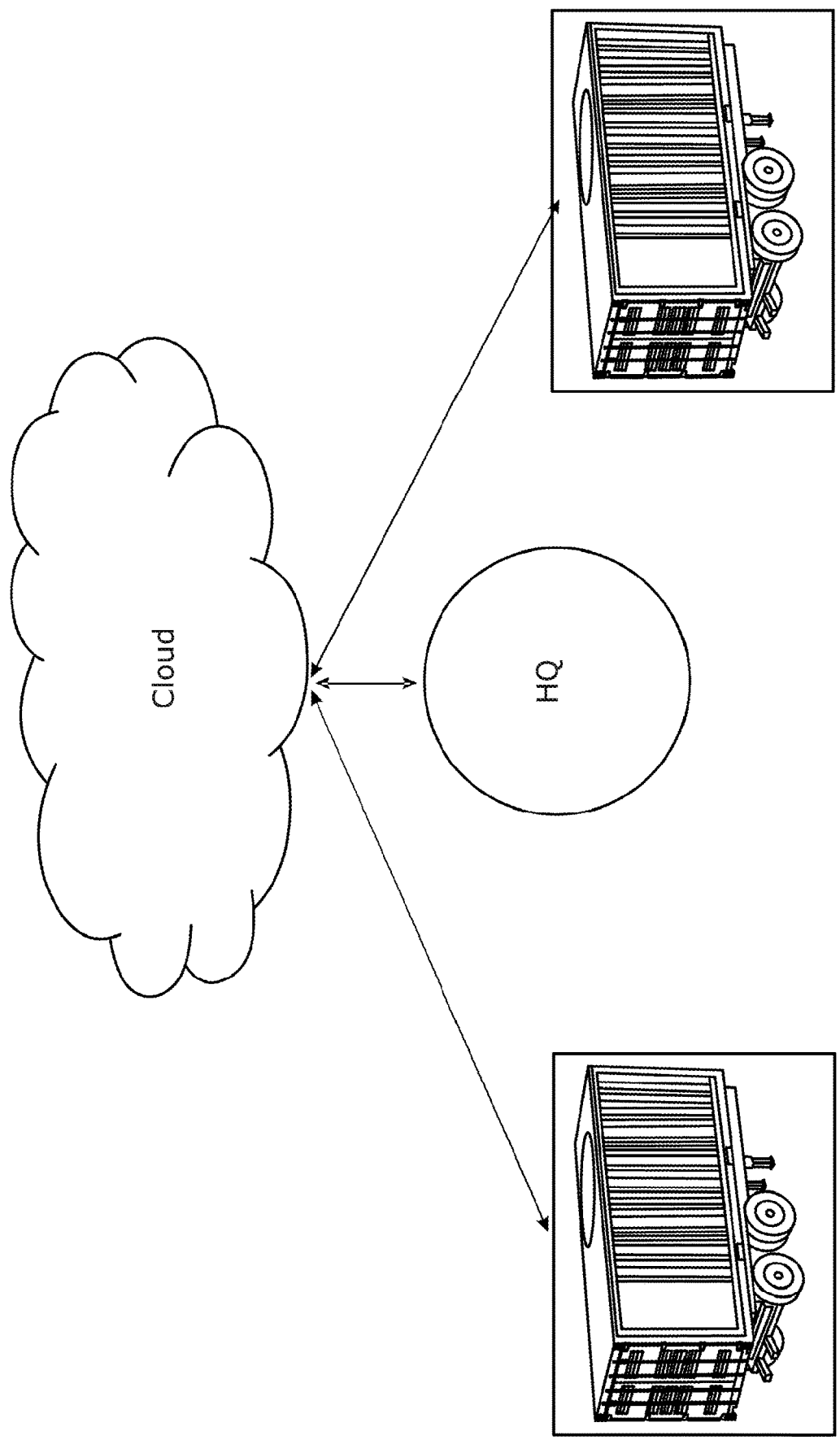
FIG. 9 is a schematic diagram showing the network and communication arrangement of two surveillance, security and enforcement units according to an embodiment of the application.

FIG. 9 illustrates an embodiment showing the communication arrangements the container may operate with. Here the container is identified as Biological & and Chemical Command Vehicle SV01. Additionally a second similar container is provided as SV01. SV02 may be provided at a location near to SV01, for example for surveillance at the same event. These containers are arranged to communicate securely via the internet and store data in secure storage accessible from the internet, such as a private secure cloud.

The private secure cloud and internet link may provide: System authorizations; Communication; Video streaming; Data access; and Remote control.

Although the figure shows two containers deployed at an event or location, any number of containers may be deployed and communicate via the internet or cloud. In particular, the containers may communicate and allow access to the above mentioned provisions to a headquarters. The headquarters may be located remotely. In one example, the containers may be deployed at an event such as a football match, with the containers located around the periphery of the football stadium or arena complex. The headquarters may be located in a building of the football stadium, or may be located at a local police station or offices of security personnel.

Each container or SV (surveillance vehicle) may have live data feeds and remote robotic control provided via the secure cloud, such as back to the headquarters or another SV. The remote control may be used to activate any module within the SV, and may be with authorization from headquarters. The UAVs mentioned above may also be launched with authorization sent from headquarters.

Although the embodiment of FIGS. 1a and 1b show five modules 11-15 installed in the container or unit, the present application is not limited to this arrangement. The modular approach allows other numbers of modules to be installed in the unit, or after installation some modules can be removed before redeployment at another event. Accordingly, any one or more of the five modules described above may be included in the unit. If only one or two or perhaps three modules are required a smaller container could be used. In some instance it may be useful to include multiple modules of the same kind in the unit. Thus, the interchangeability and removability of modules, as well as the deplorability of the container provide solutions for a variety of events.

The above described embodiments provide a flexible modular approach to surveillance, security and/or enforcement equipment. However, in some circumstances the modular approach may not be required. We now describe an exemplary arrangement which benefits from many of the above features but does not require modularity. Equally parts of the embodiment described below may be implemented in the embodiment described above. In one embodiment the equipment may be built directly into the unit rather than into a module which is later installed in the container or unit. For example, if there is only one module to be fitted. In such arrangements there would not be the need for an opening in the container for loading the module through for installation.

Figure 10:
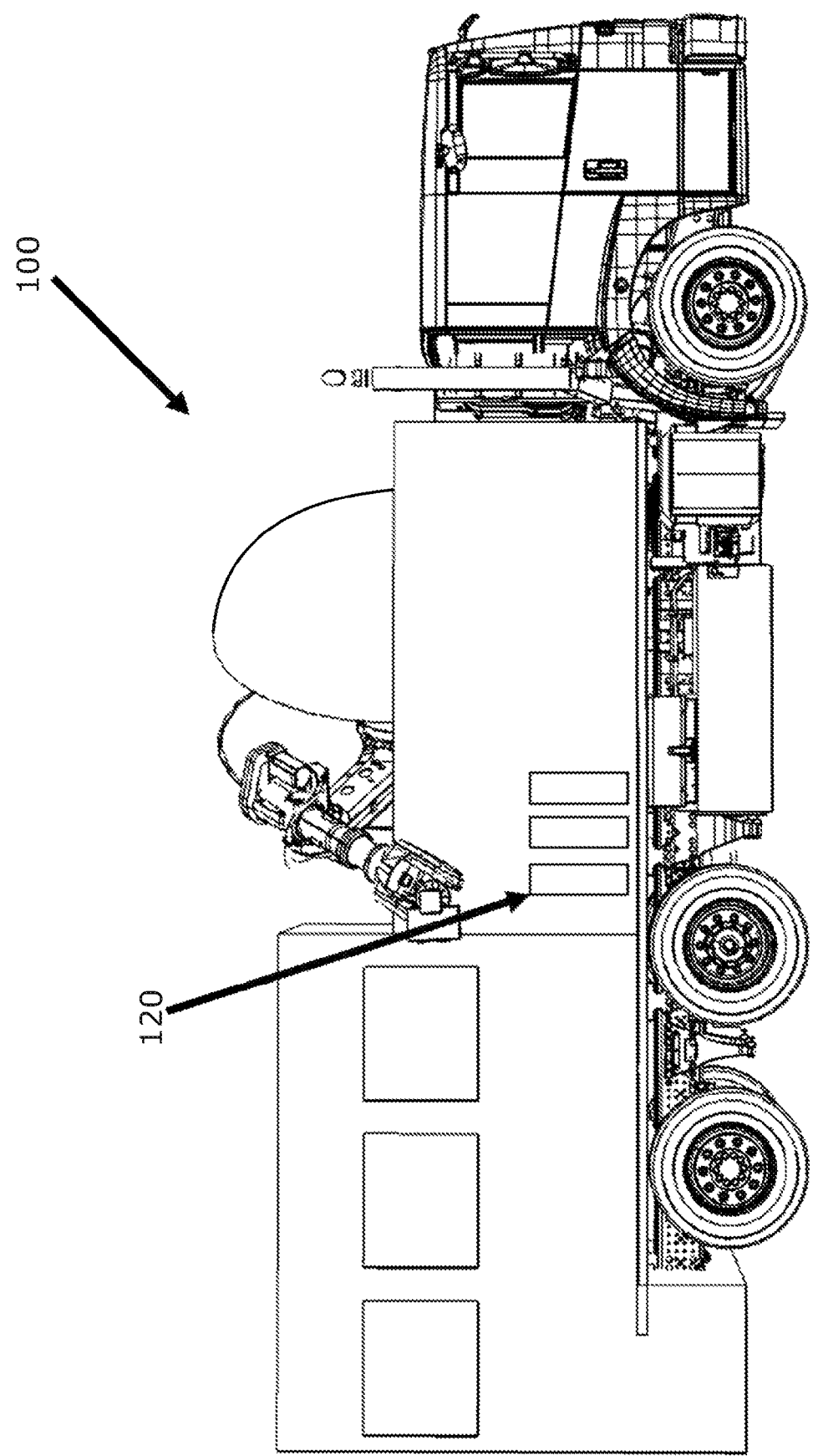
FIG. 10 shows a side view of a surveillance, security and enforcement vehicle according to an embodiment of the present application, in which a security vehicle performs stealth functions.
Figure 11:
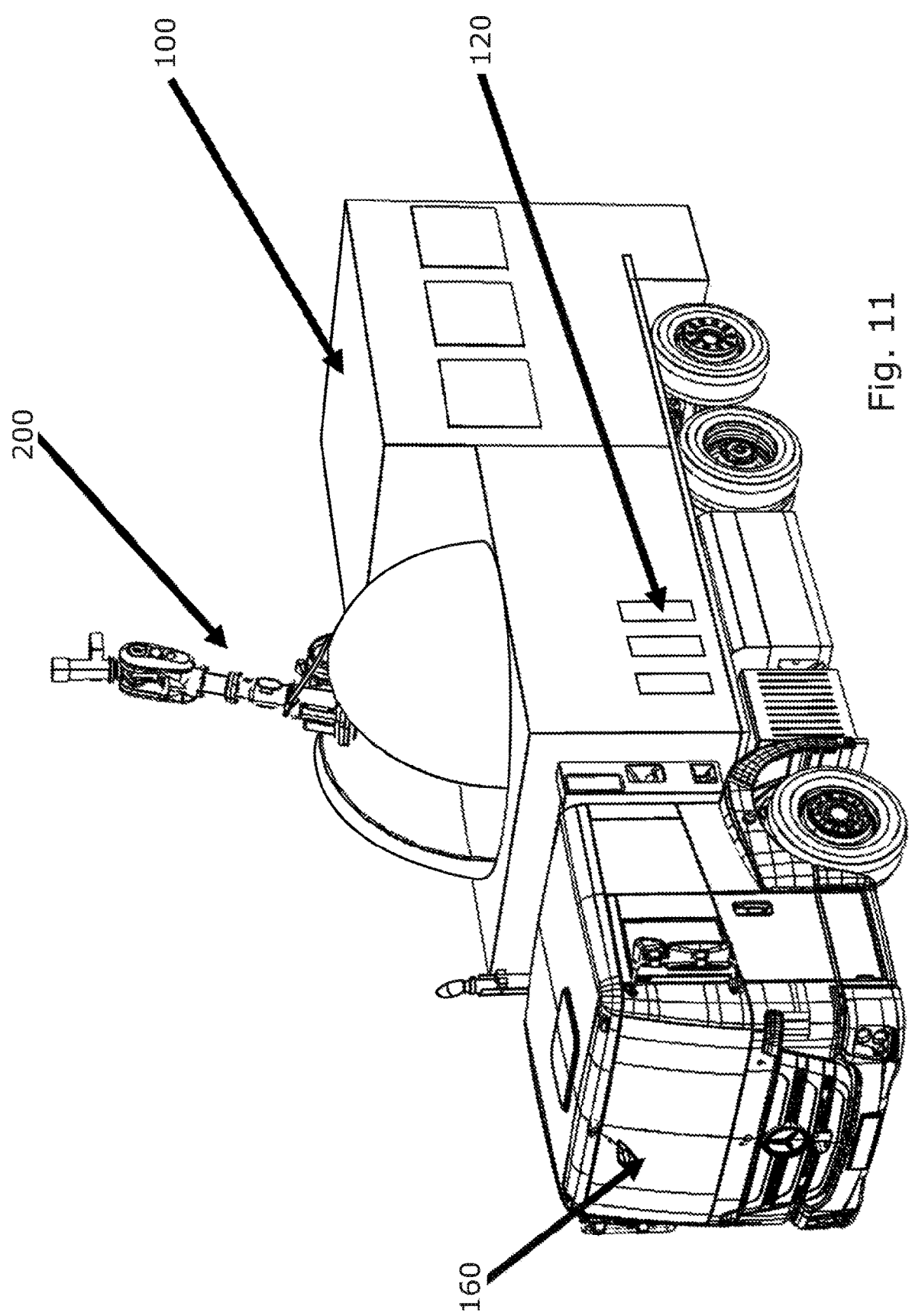
FIG. 11 shows a robotic arm coupled to a surveillance, security and enforcement management vehicle according to an embodiment of the application.

FIGS. 10 and 11 show a surveillance, security and enforcement unit 100 according to an embodiment of the present application. The unit 100 is vehicle mounted such as on a truck, lorry or van. The unit itself may be detachable from the vehicle such that the vehicle may be used elsewhere. For example, the cab 160 or motive power may be decoupled from the unit which may be a wheeled trailer or un-wheeled load, payload or bed for example of a flat-bed lorry.

Figure 16:
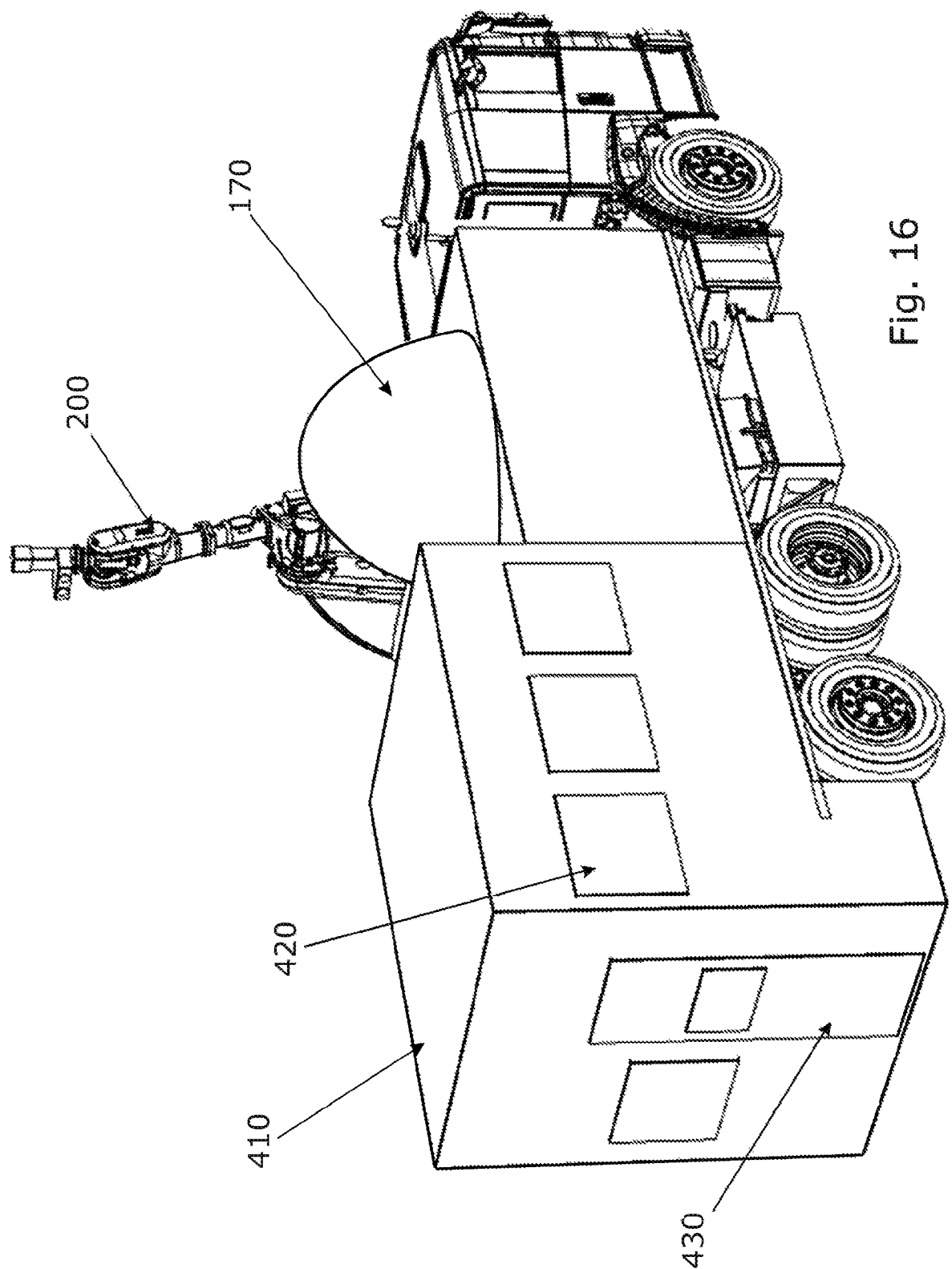
FIG. 16 shows a detailed rear perspective view of a surveillance, security and enforcement vehicle showing a robotic arm according to an embodiment of the application.

As shown in FIG. 16, the unit comprises a cabin 410 which provides space for computer surveillance equipment and processing. The cabin may be manned, or may be unmanned for remote running via a headquarters or another surveillance unit. If manned the cabin permits personnel to undertake monitoring of surveillance data such as on display screens, and may include video and sound feeds from the area under surveillance. The cabin may comprise windows 420, which may be have one-way glass for viewing out from the cabin only. The cabin may also have a door 430 to provide access into the cabin.

As shown in FIGS. 10 and 11 the unit includes a robotic arm 200 with an end effector mounted thereon. The end effector is able to select, engage, pick up and operate any one of multiple function modules 120 which are stowed in the unit within reach of the robotic arm. The function module may comprise different types of camera to perform different surveillance functions, such as those described above. More details of the different modules is provided elsewhere in this document.

The unit includes a safety housing or turret 170 which partially surrounds the robotic arm. The safety housing or turret 170 may, for example, move with some movement of the robotic arm. As set out below the robotic arm has multiple axes of movement. A first axis of movement is rotation in a horizontal plane (that is, azimuth or about a vertical axis). The safety housing may, for example, rotate with this rotational movement of the robotic arm. The safety housing also has an aperture or slot aligned with the direction about which the elevation angle or pitch of the robotic arm can move. The safety housing provides two functions. Firstly it provides protection to persons in the vicinity of the arm to avoid collision between the arm and the person. Secondly the housing provides some visual shielding so that the view of the robotic arm and surveillance unit is partly hidden. The shape of the safety housing may, for example, be dome-shaped, spherical, hemi-spherical or cylindrical, such that on movement of the safety housing the spatial envelope taken up by the housing does not change.

Figure 12:
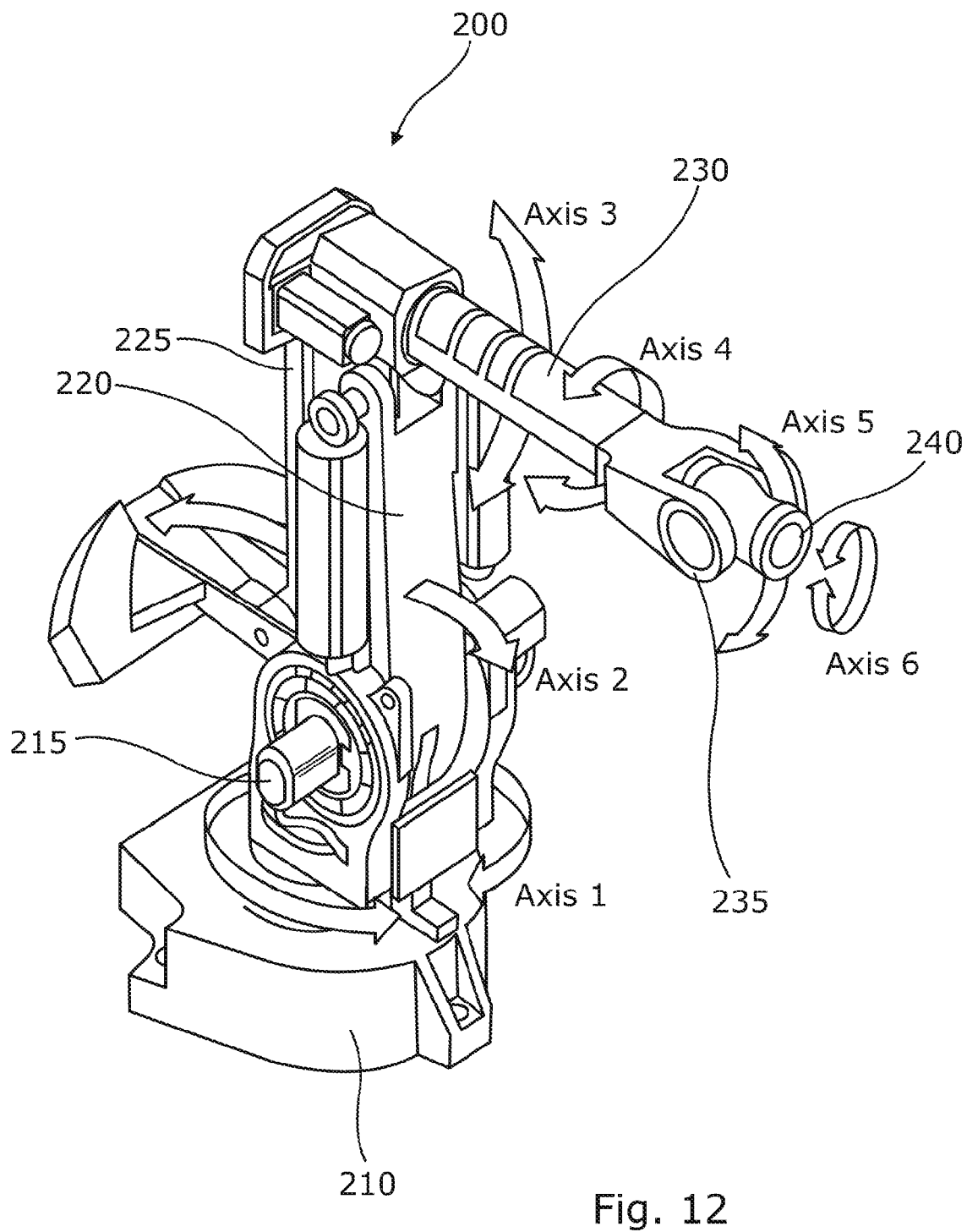
FIG. 12 is a schematic diagram of a six-axis robotic arm.

FIG. 12 shows a six-axis robotic arm 200. That is, a robotic arm that can rotate about six independent axes. This provides the robotic arm 200 with six degrees of freedom, and so the robotic arm 200 may also be called a six degrees of freedom (6-DOF) robotic arm. This robotic arm may be similar to that described above in relation to FIG. 6.

A six-axis robotic arm 200 typically comprises a base 210, a main arm 220, a forearm 230 and an end effector 240. The end effector 240 is the part of the robotic arm 200 that interacts with the outside world, and can be considered analogous to the hand at the end of a human arm. The end effector 240 is sometimes known as the end-of-arm tooling. The end effector 240 could designed for a specific task, for example a CCTV camera, or may have a multi-function purposes, number plate recognition Camera and 360 degrees streaming HD camera. The main arm 220 and forearm 230 are both sometimes called the upper arm and lower arm, depending on the orientation of the robotic arm 200. However, to avoid confusion, we shall refer only to the terms main arm 220 and forearm 230 in this description.

The main arm 220 and base 210 are connected by a joint known as the shoulder joint 215 which allows for both the pitch and yaw of the main arm 220 relative to the base 210. The pitch is the angle of the robotic arm 200 with the horizontal and the yaw is the azimuthal angle of the robotic arm 200. The main arm 220 and forearm 230 are connected by a joint known as the elbow 225 which allows for pitch and roll of the forearm 230 relative to the main arm 220. The roll is the twist angle of the forearm 230 along its axis. Finally, the end effector 240 is connected to the forearm 230 by a joint known as the wrist 235 which allows for both pitch and roll of the end effector 240 relative to the forearm 230. These parts of the robotic arm 200 are shown in FIG. 12 along with the movements allowed by each of the joints. These parts of the robotic arm 200 together allow the positioning and orientation of the end effector 240 within the work envelope of the robotic arm 200. Of course, other designs of six-axis robotic arms are possible, and the above description is merely to illustrate a typical example.

The robotic arm 200 is moved by the use of actuators or drives (not shown). These actuators are typically located at or near to the joints of the robotic arm 200. The actuators may be hydraulic, pneumatic or electrical. In general, hydraulic actuators are used for heavy payloads where power is the biggest consideration. Electrical actuators are used when there is a need for more precise control of the end effector 240, and power is of a lesser consideration.

Sensors (not shown) are distributed throughout the robotic arm 200 so that the exact position of the parts of the robotic arm 200 can be relayed to a control unit. Sensors may also be used to provide feedback to the control unit that the robotic arm 200 is close to an obstruction so that collision with the obstruction can be avoided.

Figure 13:
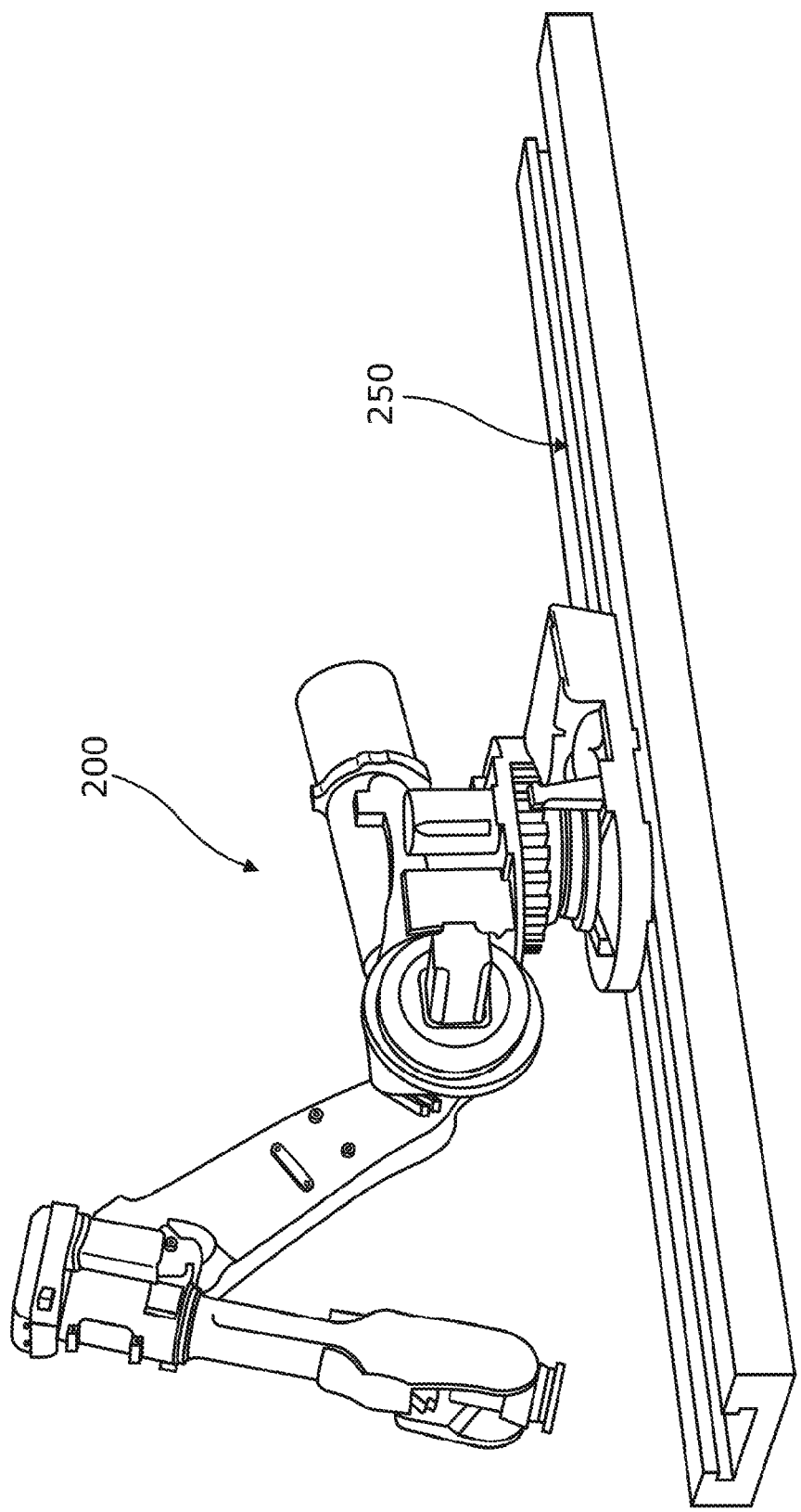
FIG. 13 shows a six-axis robotic arm on a guiding track providing a seventh degree of freedom.

In this embodiment, in order to provide even more maneuverability of the robotic arm 200, the base 210 of the robotic arm 200 could be coupled to the base of the lorry 100 via a guide track 250, as shown in FIG. 13. This guide track 250 might take the form of a rail in which the base is firmly held, but which enables the base of the robotic arm 200 to move in a transverse direction relative to the length of the vehicle, or any other guide which allows transverse motion of the robotic arm 200 whilst coupling the robotic arm 200 to the vehicle 100. The addition of this seventh degree of freedom allows for a greater work envelope of the robotic arm 200. That is, the robotic arm 200 can reach further distances, and in particular can be moved from one side of the vehicle 100 to the other, or along the vehicle. By moving from one side of the vehicle to the other any objects which may block a view to the surveillance device coupled to the end effector may be avoided, so as to obtain a clear line of sight to the area under surveillance.

The surveillance, security and enforcement management vehicle 100 with robotic arm 200 can be used for variety surveillance, security and enforcement management functions. For example, the surveillance, security and enforcement management vehicle 100 could be used for surveillance (i.e. CCTV) management equipment, for example surveillance (CCTV) cameras, facial recognition camera, speed camera, video streaming cameras, a GPS receiver, RFID reader, drone launcher, or applications developed by a third party contractor which has been configured to transmitted or receive data.

Figure 14:
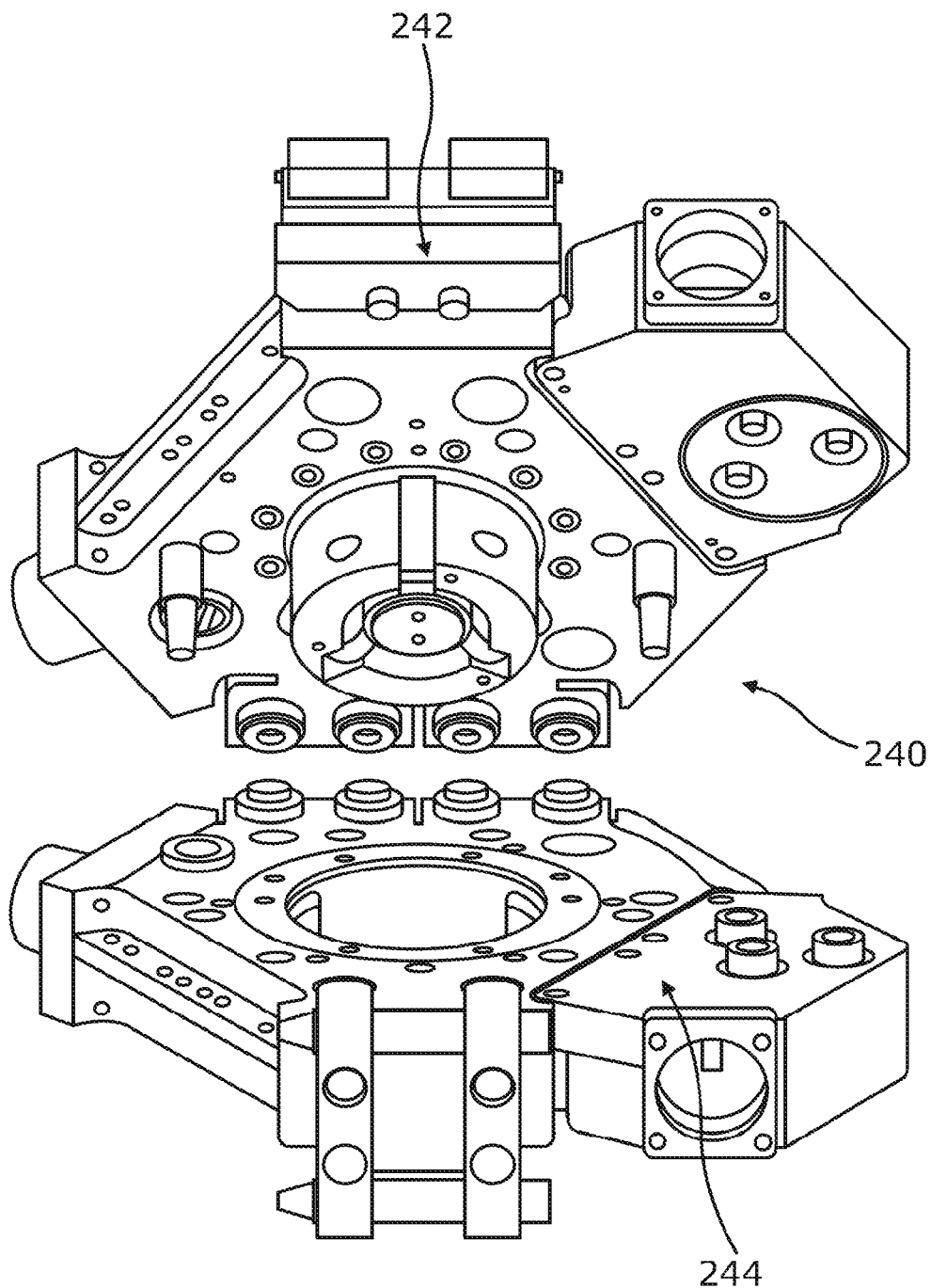
FIG. 14 shows a docking plate as the end effector and an interchangeable module according to an embodiment of the application.

In order to fulfil this multi-purpose role, the end effector 240 could be a docking plate that allows the interchangeable attachment of different modules, as shown in FIG. 14. In this figure, the upper plate 242 would form the end effector 240 of the robotic arm 200 and the lower plate 242 would be attached to whichever module is most suited for the particular function that is required. In this manner, a selection of different interchangeable modules could be kept on the vehicle to perform different functions. Whenever, the robotic arm 200 is required to perform a different task, the docking plate could be disengaged from the current module, and the appropriate module easily attached. For example, the modules could be grippers, dedicated coupling devices or video surveillance devices. The docking plate could allow the connection of any necessary facilities to the module, for example electrical, pneumatic or hydraulic connections. The modules could be changed manually by an operator, or the robotic arm 200 could change the module itself. For example, if the selection of modules were kept in a position in reach of the robotic arm 200, the robotic arm 200 could quickly and autonomously change the module to perform a desired function. It would then be unnecessary to manually change the end effector 240 to match the function that is to be performed and so reduce the workload of the operators. Furthermore, the docking plate of FIG. 14 may also be used as the docking plate or end effector for the reconnaissance module 14 described above.

As an example of the present application, when the surveillance, security and enforcement management vehicle 100 is used for a variety of surveillance, security and enforcement management functions. When one device has completed its function the module 242 attached to 244 would be undocked onto a docking plate and 242 released (FREE) to pick up another assigned module.

Figure 15:
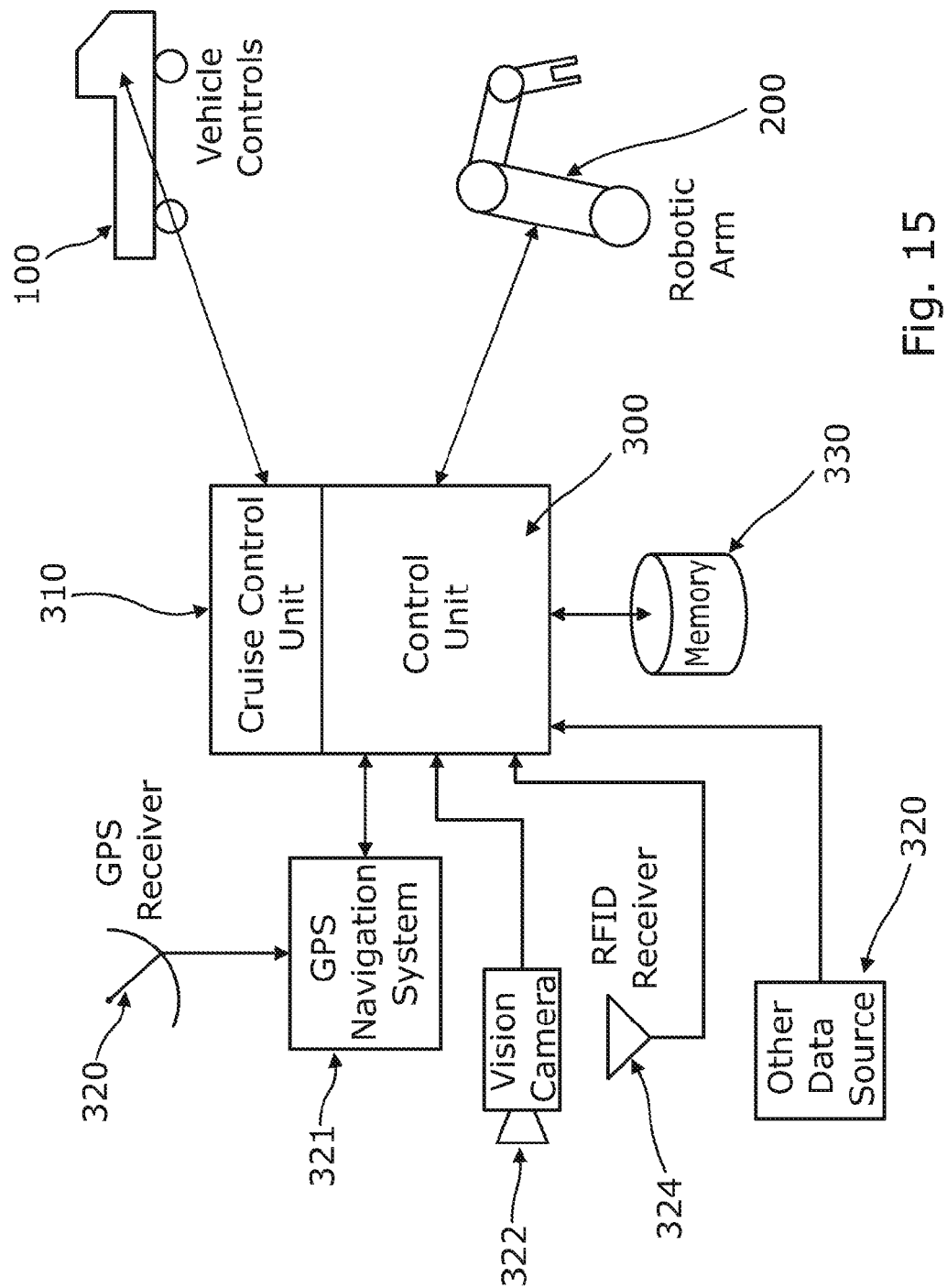
FIG. 15 is a block diagram of the main functional components of the surveillance, security and enforcement vehicle.

In an example, a control unit 300 controls the movement of the robotic arm 200 as schematically depicted in FIG. 15. The control unit 300 may take data from one or more sources to determine how the robotic arm 200 is to be controlled. For example, the control unit 300 may receive data from any one or more surveillance, security and enforcement cameras 322 to provide visual data, HQ (Head Quarters) receiver 320 to provide geographic location data or data from an RFID or live feed receiver 324 regarding the proximity of an RFID device. It may further receive other forms of data from other data sources, for example CAD data, a map or other type of plan.

For example, the control unit 300 may be provided with CAD (computer aided design) or CAE (computer-aided engineering) data, designed for example using the proprietary software EPLAN, providing the desired layout of the positions of a set of area. The control unit 300 can then control the robotic arm 200 to position the surveillance, security and enforcement desired position either via the manned cabin or remotely from HQ (Head Quarters).

Other data sources may also provide data to the control unit 300 to help control the robotic arm 200. For example, machine surveillance, security and enforcement cameras could be mounted on the vehicle. The video cameras 322 may be mounted anywhere on the vehicle 100.

Alternatively, the control unit 300 may provide some signal to the driver that the desired position is out of reach of the work envelope of the robotic arm 200 or robot not in a safe position to move. The signal may provide details of how the course of the vehicle could be corrected in order to allow the robotic arm 200 to reach the desired position. For example, the signal may include an indication, either visual or audio, that the vehicle needs to be steered in a certain direction in order that the robotic arm 200 arrives within reach of the desired position.

A HD surveillance (CCTV) cameras 322 could also be mounted on the robotic arm 200, for example on or near the end effector 240. This HD surveillance (CCTV) cameras 322 could then provide visual data to the control unit 300 regarding the position of the end effector 240 relative to the subject area of interest. In the example of retrieving data from a select target area, the visual data could be processed using machine vision techniques to provide information regarding the distance of the end effector 240 from the selected object. This would allow the control unit 300 to control the movement of the robotic arm 200 to position the end effector 240 in the correct orientation for any enforcement protocols (Civilian or Government Contracts).

The control unit 300 could be in communication with a data storage device 330 in order to store data. The data storage device 300 could be any device suitable for storing data, for example, a hard drive or flash memory. The control unit 300 could then store data relevant to the surveillance, security and enforcement management function. For example, if the surveillance, security and enforcement management module was fitted with a GPS receiver 320 to provide location of the robot position to the control unit 300, the position of the vehicle 100 could be stored. This would be especially useful when the vehicle 100 is being used to deploy surveillance (Drones) equipment as the exact position of each item of equipment could be stored with ID creating a recorded.

The surveillance, security and/or enforcement management equipment could be provided with RFID reader or receiver 324 to enable the logging of the deployment and retrieval of the traffic management equipment. For example, the control unit 300 could store the position that a particular object of interest, along with any other relevant data, for example the time and date. Then, this information could be used to enable the tracking of each item of interest.

In order to minimize the chances of the robotic arm 200 hitting anything whilst it is in operation, it is preferable to provide the surveillance, security and/or enforcement management vehicle 100 with safety features so as to reduce the chance of accidents or injury. For example, linked to the vehicle cruise control.

Other safety features that could be incorporated with the robotic arm 200 are safety cut out switches. The area in which the robotic arm 200 moves could be monitored by sensors. These sensors would be able to detect anything, especially people, that enter the work envelope of the robotic arm 200. Any area monitoring sensors could be used, for example, passive infra-red (PIR) detectors, ultrasound detectors, pressure sensors light or light beam sensors, so that if someone accidentally got too close to the robotic arm 200, the robotic arm 200 would be immediately stopped to prevent injury.

The robotic arm 200 could also be fitted with switches in order to prevent the arm from hitting parts of the vehicle, for example, the cabin 160 or the base. These switches would be activated if the robotic arm 200 tried to move to a position in which contact with a part of the vehicle was likely, and provide feedback to the control unit 300 to prevent the robotic arm 200 from moving any further.

The robotic arm 200 could be provided with its own power supply, separate from the vehicle's. The power supply would depend on the needs of the particular robotic arm 200. Typically, the power supply will provide 200-600 V AC at a frequency of 50-60 Hz, and it would be preferable to be provided as three phase. An uninterruptable power supply (UPS) could be used to prevent the sudden stopping of the robotic arm 200 whilst in the middle of an operation if the power supply failed. Optionally if the flatbed is in a stand-alone state an external supply or data connection could be used.

To explain how some of the various features of the present application may be used together, a detailed description of a specific embodiment of the present application in which the surveillance, security and/or enforcement management vehicle is used to collect surveillance, security and/or enforcement data will now be discussed. However, it should be apparent how these features could also be used in combination in a similar manner when the application is employed in other surveillance, security and/or enforcement management roles, for example large crowded venues, Airports, Docks and Ports, or Government contracts using any of the modules previously discussed.

It should be understood that not all of the features discussed in this example are essential features of the application, and various combinations of the features may be used depending on the circumstances.

Plan data including the desired objects or areas to be studied is loaded into the control unit 300 and stored in memory. The plan data includes GPS coordinates of the position of the start of the desired position layout. A GPS receiver 320 coupled to a GPS navigation system 321 receives these coordinates from the control unit 300 and directs the driver of the vehicle to a location near to the desired position. The control system then indicates to the driver that the position has been reached, for example via a visual display or an audio signal, so that the driver can stop the vehicle ready to start it's task.

Figure 17:
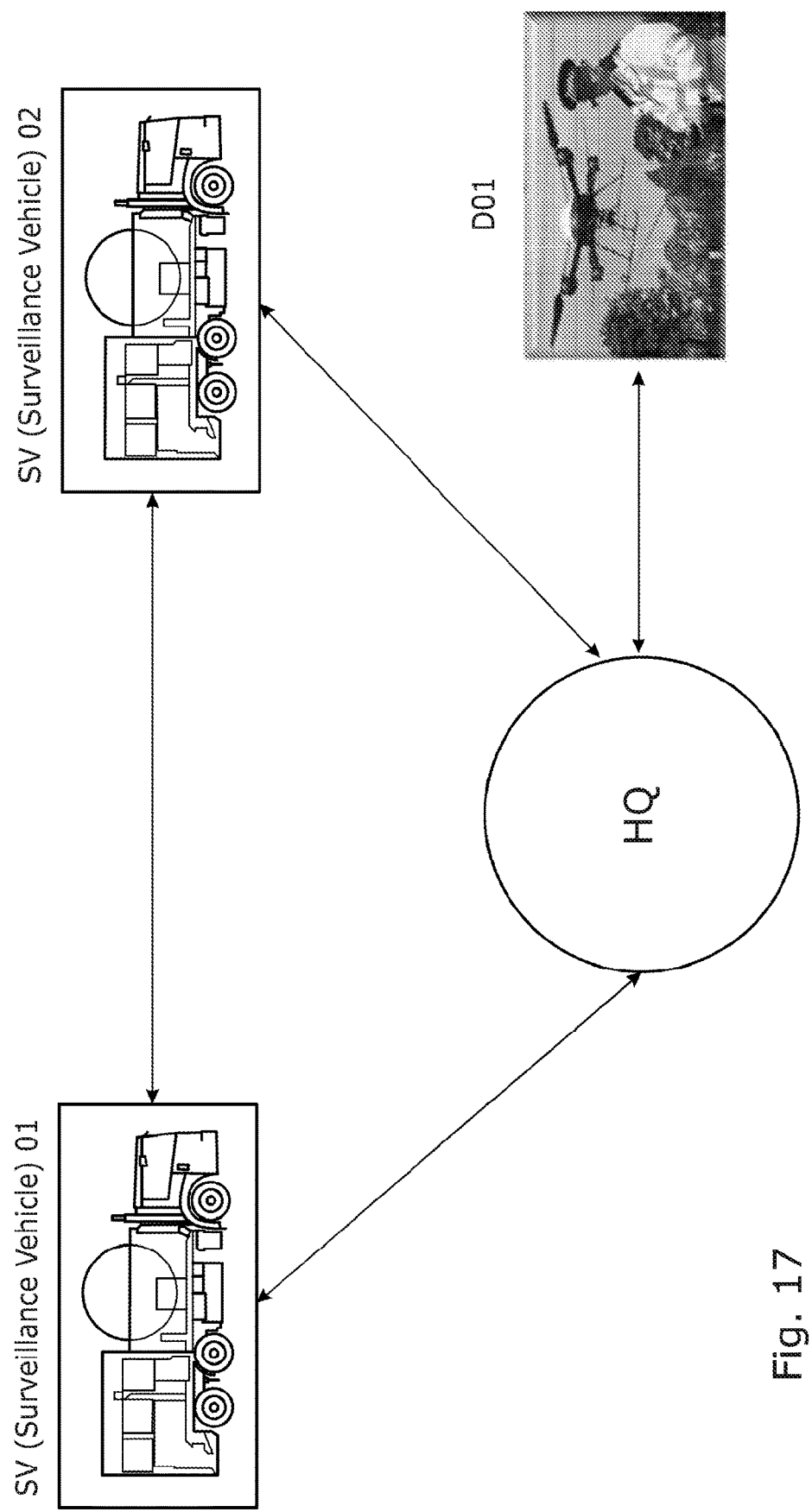
FIG. 17 is a diagram showing multiple units in communication with each other and a headquarters.

FIG. 17 shows how multiple surveillance units 100 can communicate with each other and with a headquarters or central command center. For example surveillance vehicle SV01 may be located at a first location and surveillance vehicle SV02 may be located at a second location. More than two units may also communicate and be located at other locations. SV01 may send surveillance data wirelessly direct to SV02 and/or vice versa so the units are provided with more data than is gathered by the units alone. SV01 and SV02 may also communicate with headquarters. Command and control of the multiple units may be based in one of the units or at headquarters, to control the surveillance based on data gathered.

In a further aspect an unmanned aerial vehicle or drone can be launched, for example from a launch platform mounted on a vehicle or unit 100. The drone may provide more targeted remote surveillance in areas not accessible by the vehicles or units, For example, the drone may be used for surveillance inside football stadiums.

The multiple surveillance units 100 (SV01, SV01) together form a network of data gathering units which share information to provide a continuous and wide area surveillance capability. The inclusion of drone D01 furthers this network of data gathering.

Many other surveillance, security and/or enforcement management functions could be envisaged for the aforementioned surveillance, security and/or enforcement unit or vehicle 100 having a six axis robotic arm 200, and the subject matter of the present application, defined by the claims, is meant to encompass all such functions.

Further example embodiments are provided in the following clauses:

A. A surveillance, security and/or enforcement unit comprising a robotic arm, the robotic arm having at least six axes of movement and comprising a base and an end effector, the base being coupled to the unit and the robotic arm arranged to perform a surveillance, security and/or enforcement function, wherein the surveillance, security and/or enforcement unit is configured for deployment from a vehicle or as a vehicle, at a surveillance, security and/or enforcement location.

B. The surveillance, security and/or enforcement unit of clause A, wherein the unit is a trailer or payload arranged for coupling to a vehicle for delivery to a surveillance, security and/or enforcement location, the unit capable of detachment from the vehicle or part of the vehicle.

C. The surveillance, security and/or enforcement unit of clause A or clause B, wherein the unit is trailer or body unit which is detachable from the cab or drive unit of a truck, lorry, van or other vehicle.

D. The surveillance, security and/or enforcement unit of any preceding clause, wherein the end effector is adapted to engage a function module for performing the surveillance, security and/or enforcement function, and the function module comprises at least one of a video camera, stills camera, vehicle speed camera or radar.

E. The surveillance, security and/or enforcement unit of any preceding clause, wherein the function module or surveillance data processing equipment is arranged to perform any one or more of: facial recognition, vehicle number plate recognition, and vehicle speed determination.

F. The surveillance, security and/or enforcement unit of any preceding clause, further comprising a cabin having communication means for transmitting and receiving surveillance data from a function module coupled to the end effector and further comprising surveillance data processing equipment.

G. The surveillance, security and/or enforcement unit of clause F, wherein the data processing equipment includes a controller configured to control the robotic arm to position the end effector at a desired position and orientation to perform surveillance of a selected area or areas.

H. The surveillance, security and/or enforcement unit of clause G, wherein the selected area or areas are selected based on information comprised in the received surveillance data.

I. The surveillance, security and/or enforcement unit of any preceding clause, further comprising communication means for communicating with one or more deployable units and/or a headquarters/command center to receive surveillance data from said one or more deployable units and/or a headquarters/command center, and to process said received data.

J. The surveillance, security and/or enforcement unit of clause I, wherein the data processing equipment includes a controller configured to control the robotic arm to position the end effector at a desired position and orientation to perform surveillance of a selected area or areas.

K. The surveillance, security and/or enforcement unit of clause J, wherein the selected area or areas are selected based on information comprised in the received surveillance data.

L. The surveillance, security and/or enforcement unit of any preceding clause, further comprising a launch platform for launching an unmanned aerial surveillance vehicle adapted to communicate with the surveillance, security and/or enforcement unit.

M. A surveillance, security and/or enforcement system comprising:
the surveillance, security and/or enforcement unit of any preceding clause, and further comprising a launch platform for launching an unmanned aerial surveillance vehicle adapted to perform surveillance of areas beyond the vision range of the surveillance, security and/or enforcement unit and communicate with the surveillance, security and/or enforcement unit.

A1. A surveillance, security and/or enforcement management vehicle or vehicle removable trailer or flatbed bed comprising a robotic arm, the robotic arm having at least six axes of movement and comprising at least a base and an end effector, the base being coupled to the vehicle and the 6 robotic arm being arranged to perform a surveillance, security and/or enforcement function.

A2. A surveillance, security and/or enforcement management vehicle or vehicle removable trailer or flatbed of clause A1 wherein the robotic arm is maneuverable in order to position the end effector in a plurality of positions such as to move an object from the vehicle to an adjacent surface.

A3. A surveillance, security and/or enforcement management vehicle or vehicle removable trailer or flatbed of any one of clauses A1 and A2 further comprising a guiding track on which the base of the robotic arm is coupled and which is arranged to allow a transverse translational motion of the entire robotic arm relative to the vehicle.

A4. A surveillance, security and/or enforcement management vehicle or vehicle removable trailer or flatbed of any one of clauses A1 to A3 wherein the end effector is a docking plate adapted to receive an interchangeable module.

A5. A surveillance, security and/or enforcement management vehicle or vehicle removable trailer or flatbed of any of clauses A1 to A4 further comprising a control unit to control the motion of the robotic arm, the control unit being configured to process information from at least one data source and control the movement of the robotic arm in response to data received from the at least one data source where connected to the vehicle of any of clauses A1 to A4 or controlled remotely.

A6. A surveillance, security and/or enforcement management vehicle or vehicle removable trailer or flatbed of clause A5, wherein the at least one data source is at least one of a surveillance (CCTV) cameras, facial recognition cameras, number plate recognition cameras, video streaming cameras, a GPS receiver, RFID reader, drone launcher and lander, or applications developed by a third party contractor which has been configured to transmitted or receive data sent from or via the vehicle of any of clauses A1 to A5, CAD software, a map or a plan.

A7. A surveillance, security and/or enforcement management vehicle or vehicle removable trailer or flatbed of any one of clauses A5 and A6, further comprising a security control department located on clause A1.

A8. A surveillance, security and/or enforcement management vehicle or vehicle removable trailer or flatbed of clause A7, located on the flatbed is a control cabin equipped with computers, video monitors, data communication devices and a seating area deemed appropriate to facilitate the functionality of any of clauses A1 to A7.

A9. A surveillance, security and/or enforcement management vehicle or vehicle removable trailer or flatbed of any one of clauses A1 to A8, wherein the end effector is adapted to pick up and release, security and enforcement management equipment.

A10. A surveillance, security and/or enforcement management vehicle or vehicle removable trailer or flatbed of clause A9, wherein the security and enforcement management equipment is at least one of least one of a surveillance (CCTV) cameras, facial recognition cameras, number plate recognition cameras, video streaming cameras or third party security application.

A11. A surveillance, security and/or enforcement management vehicle or vehicle removable trailer or flatbed of any one of clauses A5 to A10, wherein the surveillance, security and enforcement management vehicle bed is arranged to position security vehicle is a position where the vehicle could remain or the removable flatbed dislocated to complete its assigned task.

A12. A surveillance, security and/or enforcement management vehicle or vehicle removable trailer or flatbed of clause A11, may be connected to an external power supply or network communication cabled for a more secure data transmission.

A13. A surveillance, security and/or enforcement management vehicle or vehicle removable trailer or flatbed of clause A7, wherein the subject area is an area to be surveyed.

A14. A surveillance, security and/or enforcement management vehicle or vehicle removable trailer or flatbed of clause A13, wherein the end effector is adapted to perform a range of security functions.

A15. A surveillance, security and/or enforcement management vehicle or vehicle removable trailer or flatbed substantially as shown in FIGS. 1 to 7.

B1. A surveillance, security and enforcement management vehicle or vehicle removable trailer or flatbed comprising a robotic arm coupled to the vehicle, the robotic arm being movable about at least 5 or six axes, the vehicle further comprising a control unit being configured to process information from at least one data source and controlling the robotic arm in order to automatically survey, launch or receive surveillance equipment.

B2. A surveillance, security and/or enforcement management vehicle or vehicle removable trailer or flatbed of clause B1, surveillance (CCTV) cameras, facial recognition cameras, number plate recognition cameras, video streaming cameras, a GPS receiver, RFID reader, drone launcher and lander, or applications developed by a third party contractor which has been configured to transmitted or receive data sent from or via clauses A1, CAD software, a map or a plan.

B3. A surveillance, security and/or enforcement management vehicle or vehicle removable trailer or flatbed of clause B1 or B2, wherein the robotic arm is configured to stack and/or store applications modules configured for security surveillance purposes within the area of clauses A1.

B4. A surveillance, security and/or enforcement management vehicle or vehicle removable trailer or flatbed vehicle comprising a robotic arm coupled to the vehicle, the robotic arm movable about at least six axes, the vehicle further comprising a control unit being configured to process information from at least one data source and controlling the robotic arm to provide surveillance or security within the aforementioned environment.

B5. A surveillance, security and/or enforcement management vehicle or vehicle removable trailer or flatbed of clause B4, wherein the at least one data source is at least one surveillance (CCTV) cameras, facial recognition cameras, number plate recognition cameras, video streaming cameras, a GPS receiver, RFID reader, drone launcher and lander, or applications developed by a third party contractor which has been configured to transmitted or receive data sent from or via clauses A1, CAD software, a map or a plan.

B6. The vehicle or removable trailer or flatbed of any of clauses A1 to A15 or B1 to B5 further comprising a control cabin equip with computers, video monitors, data communication devices and a seating area deemed appropriate to facilitate the functionality clauses A1, the protective working casing is move via the robotic control unit according to the working envelope of the robotic arm.

B7. The vehicle of any of clauses A1 to A15 or B1 to B56 wherein the work envelope is monitored by a sensor and the robotic arm is stopped if the sensor detects a person or unexpected object within the area.

C1. A surveillance, security and/or enforcement management method comprising controlling a robotic 5 or 6 arm coupled to a vehicle to perform a traffic management function, the robotic arm movable about at least six axes.

C2. The surveillance, security and/or enforcement management method of clause C1 wherein the robotic arm is controlled by a control unit, the control unit being provided with data from at least one data source and the control unit control unit controlling the robotic arm in response to the data from the at least one data source.

C3. The surveillance, security and/or enforcement management method of clause C2 wherein the at least one surveillance (CCTV) cameras, facial recognition cameras, number plate recognition cameras, video streaming cameras, a GPS receiver, RFID reader, drone launcher and lander, or applications developed by a third party contractor which has been configured to transmitted or receive data sent from or via clauses A1, CAD software, a map or a plan.

C4. The surveillance, security and/or enforcement management method of clauses 32 or 33 wherein the control unit performs surveillance, security and enforcement management functions on the vehicle or vehicle removable trailer or flatbed so that the robotic arm can be moved to a desired position on a the vehicle to perform the surveillance, security and/or enforcement management function via the modules attached.

C5. The surveillance, security and/or enforcement management method of any one of clauses C2 to C4, wherein the surveillance, security and/or enforcement management functions is the controlling the robotic arm in order to automatically survey, launch or receive surveillance equipment.

C6. The surveillance, security and/or enforcement management method of clause C5, wherein the surveillance, security and/or enforcement management equipment is at least one of a surveillance (CCTV) cameras, facial recognition cameras, number plate recognition cameras, video streaming cameras or third party security application.

C7. The surveillance, security and/or enforcement management method of clauses C5 or C6, wherein surveillance, security and/or enforcement management equipment is positioned on the management vehicle or vehicle removable trailer or flatbed at positions moved manually or remotely as of clauses H.

C8. The surveillance, security and/or enforcement management method of any one of clauses C2 to C4, wherein the surveillance, security and/or enforcement functions via the modules for the relevant environment.

C9. A computer program providing instructions to carry out the method of any one of clauses C3 to C8 either onsite or offsite (Remotely).

D1. A surveillance, security and/or enforcement management vehicle or vehicle removable trailer or flatbed bed cabin adapted to be manned or unmanned as deemed necessary by the command center and therefore any until could be controlled remotely.

Conclusion

The person skilled in the art will readily appreciate that various modifications and alterations may be made to the above described embodiments without departing from the scope of the appended claims.

What is claimed is:

1. A deployable unit for one or more of surveillance, security and enforcement, comprising:
    a container configured for deployment from a vehicle or by air at one or more of a surveillance, security and enforcement location, the container comprising:
       two or more removable modules having equipment for performing one of more of surveillance, security and enforcement operations, each module being sized to accommodate a person standing and each module being removable from the container, each module being removably connected to utilities in the container by a docking mechanism, the utilities including one or more of: power, air-conditioned air, water and communications; and
       a housing having first sides and second sides, the first sides being longer than the second sides, the housing having at least one opening in one of the first sides for receiving the two or more modules into the container, wherein the at least one opening comprises doors configured to open to a size of at least the size of a module of the two or more modules for loading of the two or more modules into the container, and
       the container further comprising tracks fixed to the floor of the container and extending across the container in a direction transverse to the first sides of the container, to guide the loading of the two or more modules into the container from the at least one opening in the one of the first sides of the housing.

2. The deployable unit of claim 1, wherein the two or more removable modules comprise any two or more of the following:
    a command module for one or more of controlling other modules in the unit and sending communications to a remote location, the command module comprising computing and data processing resources configured to receive data from other modules in the deployable unit and process the data;
    a reconnaissance module for performing reconnaissance of the environment surrounding the unit, the reconnaissance module connected to cameras and sensors for far-field and near-field surveillance from the deployable unit;
    a sampling and diagnostic laboratory module for testing samples for chemical, biological, radiological and/or nuclear species, the sampling and diagnostic laboratory module configured for automated testing of samples for chemical, biological, radiological and/or nuclear species that are hazardous to human health or indicative of an explosive device;
    a decontamination module comprising a washroom for decontamination of personnel, the decontamination module comprising a washroom or washing facilities for rinsing of hazardous material from personnel or equipment; and
    a utilities module for providing utilities and/or communications services to one or more other modules in the unit, the utilities module comprising one or more of:
       a generator, or connection to grid power, to provide power to one or more other modules in the unit;
       an air-conditioning unit for providing air-conditioned air to one or more other modules in the unit;
       a water tank, or connection to a land based water supply, for supplying water to one or more other modules in the unit; and
       communications equipment for communications between the modules and to external locations by wired or wireless connection.

3. The deployable unit of claim 1, wherein the container is adapted to be deployed at a surveillance, security and/or enforcement location by air from a helicopter.

4. The deployable unit of claim 1, wherein the container is provided in accordance with one of the following:
    configured without wheels for deployment by air; or
    configured without wheels for deployment from a land vehicle by crane.

5. The deployable unit of claim 1, wherein the container has ruggedized metal faces.

6. The deployable unit of claim 1, wherein the container comprises a plurality of cameras for monitoring the surroundings of the unit.

7. The deployable unit of claim 1, wherein the unit communicates with other units forming a network of units at one or more of a surveillance, security and enforcement venue.

8. The deployable unit of claim 1, wherein the container is a shipping container.

9. The deployable unit of claim 1, wherein one of the two or more modules is a reconnaissance module comprising at least one of:
    a robotic arm configured to move a device for one or more of surveillance, security and enforcement to a position to monitor a target location proximal to the unit; and
    an unmanned aerial vehicle for launching from the reconnaissance module for performing surveillance, security and/or enforcement activities remote from the unit.

10. The deployable unit of claim 1, wherein one of the two or more modules is a reconnaissance module having a robotic arm comprising a base and an end effector, the base coupled to the reconnaissance module, the end effector arranged to receive one of one or more surveillance, security and/or enforcement devices and the robotic arm configured to move the device to a position to monitor a target location.

11. The deployable unit of claim 10, further comprising a dock array for receiving and storing the one or more surveillance, security and/or enforcement devices, wherein the robotic arm is configured to maneuver the end effector towards the dock array to engage one of the surveillance, security and/or enforcement device.

12. The deployable unit of claim 10, wherein there are two or more devices for one or more of surveillance, security and enforcement and they have different functions, the functions include at least two of:
    a camera configured for collecting images and performing facial recognition of persons in the images;
    a camera configured for collecting images and performing number plate recognition of vehicles in the image;
    a speed sensor for detecting the speed of vehicles passing through a target zone; and
    one more cameras for collecting images 360° around the unit.

13. The deployable unit of claim 10, wherein there are two or more devices for one or more of surveillance, security and enforcement and they have different functions, the functions include one or more of: a UAV servicing application module; a chemical detection module; a biological detection module; and a camera/video surveillance module.

14. The deployable unit of claim 10, wherein one of the devices for one or more of surveillance, security and enforcement has multiple functions and comprises a plurality of sensors for facial recognition, number plate recognition and speed sensing, the plurality of sensors evenly distributed azimuthally around a central axis.

15. The deployable unit of claim 13, wherein the one of the devices for one or more of surveillance, security and enforcement further comprises one or more cameras for collecting images covering 360° around the unit.

16. The deployable unit of claim 10, wherein the surveillance, security and/or enforcement devices may comprise:
    one or more sensors for detecting one or more of chemical, biological, radiological or nuclear hazards.

17. The deployable unit of claim 10, wherein the base of the robotic arm is mounted to a lifting platform for raising the robotic arm through an aperture in a roof of the container to enable a device for one or more of surveillance, security and enforcement to monitor the target location.

18. The deployable unit of claim 17, wherein the lifting platform comprises a scissor lift.

19. The deployable unit claim 10, wherein the robotic arm has six-axes of movement.

20. The deployable unit of claim 10, wherein the robotic arm, at full extension, is longer than the width of the container and is arranged to extend to move the surveillance, security and/or enforcement device to a position beyond the width extent of the container.

21. The deployable unit of claim 10, further comprising one or more unmanned aerial vehicles (UAVs) for launching from the reconnaissance module for performing one or more of surveillance, security and enforcement activities remote from the unit.

22. The deployable unit of claim 21, wherein the container has an aperture in a roof thereof through which the UAV is launched.

23. The deployable unit of claim 21, wherein the reconnaissance module comprises a landing pad on which the UAV is stationed prior to launch, the UAV is powered by a battery and the UAV is adapted to recharge the battery when on the landing pad.

24. The deployable unit of claim 21, the UAV further comprising a camera or sensors arranged for collecting one or more of surveillance, security and enforcement data.

25. The deployable unit of claim 21, wherein the UAV comprises a memory and a processor configured to be programmed to control the UAV to fly a predetermined flight route and collect surveillance, security and/or enforcement data.

26. The deployable unit of claim 21, wherein the UAV is configured to be controlled or flown from a command module in the unit or from a control centre at a remote location.

27. The deployable unit of claim 21, wherein the reconnaissance module comprises a plurality of UAVs and the plurality of UAVs are stored in the reconnaissance module in a drawer system, each drawer comprising a landing pad for a UAV, each drawer arranged to slide in and out of a cabinet of the drawer system, the drawers when in a closed position in the cabinet are arranged vertically above each other, and
    the container having an aperture in a roof thereof for launch of the UAVs, the aperture positioned above the position corresponding to that of an open drawer of the drawer system.

28. The deployable unit of claim 1, wherein one of the two or more modules is a sampling and diagnostic laboratory module comprising test equipment for testing for chemical, biological, radiological, and/or nuclear species.

29. The deployable unit of claim 28, wherein the container comprises an aperture in the roof, and the sampling and diagnostic laboratory module comprises one or more unmanned aerial vehicles (UAVs) for launching through the aperture in a roof of the container, the one or more UAVs comprising apparatus for sampling an environment around the UAV.

30. The deployable unit of claim 29, wherein the sampling and diagnostic laboratory module further comprises a robot programmed to take an environmental sample from the UAV and submit the sample to a selected one of the test equipment for testing for one or more of specified chemical, biological, radiological, and nuclear species.

31. The deployable unit of claim 30, wherein the robot is configured to be controlled from a location remote from the container.

32. The deployable unit of claim 1, wherein one of the two or more modules is a washroom for decontamination of personnel from one or more of chemical, biological, radiological, and nuclear hazards, the washroom comprising a tank for storing water for washing the hazard from the person.

33. The deployable unit of claim 1, wherein one of the two or more modules is a command module for controlling other modules in the unit and comprises communications apparatus for sending or receiving communications from a remote location.

34. The deployable unit of claim 33, wherein the communications apparatus is configured for communicating with one or more other deployable units for one or more of surveillance, security and enforcement.

35. The deployable unit of claim 1, wherein the docking mechanism for connecting each module to the utilities comprises upper and lower plates for engagement to connect the utilities from the container to the module, wherein each module comprises an upper plate in a base of the module and the container comprises lower plates, each lower plate for engagement with a respective upper plate of a module.

36. The deployable unit of claim 1, wherein one of the second sides of the housing further comprises a door to an exterior of the container, and one or more of the removable modules comprises a door that when the module is loaded into the container the door of the second side of the housing and the door of the module are aligned in the corresponding positions to provide a walkway for a person to enter the module from outside the housing.

37. The deployable unit of claim 36, wherein two or more of the removable modules comprise doors that when the two or more modules are loaded into the container the doors of the modules are aligned together to provide a walkway for a person to walk from one module to another.

38. A method of one or more of surveillance, security and enforcement, comprising:
  configuring a unit for one or more of surveillance, security and enforcement that comprises a container by:
    loading two or more removable modules into the container through at least one opening in a housing of the container, the housing having first and second sides, the first sides being longer than the second sides, the at least one opening comprising doors configured to open to a size of at least the size of a module of the two or more modules and loading the two or more modules there through,
    the loading comprising guiding the two or more modules into the container along tracks in the floor of the container, the tracks extending across the container in a direction transverse to the first sides of the container;
  each removable module having equipment for performing operations for one or more of surveillance, security and enforcement, and each module sized to accommodate a person standing; and
  connecting, removably, to each module, by a docking mechanism, utilities in the container including one or more of: power, air-conditioned air, water and communications;
  deploying the unit at a location for one or more of surveillance, security and enforcement;
  assessing the environment surrounding the location for one or more of surveillance, security and enforcement using automated unmanned modules provided in the unit;
  sending data produced from the step of assessing to a manned remote location; and
  deploying human resources to the location for one or more of surveillance, security and enforcement, including human resources to operate a control module in the unit.

39. The method of claim 38, wherein the container is configured for deployment from a vehicle or by air at a location for one or more of surveillance, security and enforcement; and the two or more removable modules have equipment for performing operations for one or more of surveillance, security and enforcement.

\* \* \* \* \*